US008689238B2

(12) United States Patent
Goulden et al.

(10) Patent No.: US 8,689,238 B2
(45) Date of Patent: **\*Apr. 1, 2014**

(54) TECHNIQUES FOR DISPLAYING IMPRESSIONS IN DOCUMENTS DELIVERED OVER A COMPUTER NETWORK

(75) Inventors: David L. Goulden, Redwood City, CA (US); Matthew A. Shevach, San Francisco, CA (US); Dominic Bennett, Los Altos, CA (US)

(73) Assignee: Carhamm Ltd., LLC, Dover, DE (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/336,280

(22) Filed: Dec. 23, 2011

(65) Prior Publication Data

US 2012/0158491 A1 Jun. 21, 2012

Related U.S. Application Data

(63) Continuation of application No. 11/263,501, filed on Oct. 31, 2005, now Pat. No. 8,086,697.

(60) Provisional application No. 60/694,533, filed on Jun. 28, 2005.

(51) Int. Cl.
*G06F 13/00* (2006.01)

(52) U.S. Cl.
USPC ............ 719/317; 719/329; 709/202; 709/217

(58) Field of Classification Search
USPC ........................... 719/317, 329; 709/202, 217
See application file for complete search history.

(56) References Cited

U.S. PATENT DOCUMENTS

| 4,455,083 | A | 6/1984 | Elmes |
| 4,575,579 | A | 3/1986 | Simon et al. |
| 4,719,567 | A | 1/1988 | Whittington et al. |
| 4,775,935 | A | 10/1988 | Yourick |
| 4,782,449 | A | 11/1988 | Brinker et al. |

(Continued)

FOREIGN PATENT DOCUMENTS

| EP | 0631231 | 12/1994 |
| EP | 0822535 | 2/1998 |

(Continued)

OTHER PUBLICATIONS

Directive 2002/58/EC of the European Parliament and of the Council of Jul. 12, 2002 concerning the processing of personal data and the protection of privacy in the electronic communications sector (Directive on privacy and electronic communications), Official Journal L 201 , Jul. 31, 2002 p. 0037-0047.

(Continued)

*Primary Examiner* — Andy Ho
(74) *Attorney, Agent, or Firm* — Brundidge & Stanger, P.C.

(57) ABSTRACT

In one embodiment, an impression to be displayed in a placement of a web page is selected from candidate impressions that may be displayed in the placement. The candidate impression may be chosen based on behavioral data and a placement identifier particularly identifying the placement. The behavioral data may include categories of websites visited by an end-user on the client computer. The candidate impressions may be in learning modes, and the impression displayed in the placement may be selected based on its learning mode and revenue generation capability.

20 Claims, 7 Drawing Sheets

(56) References Cited

U.S. PATENT DOCUMENTS

| | | |
|---|---|---|
| 4,799,146 A | 1/1989 | Chauvel |
| 4,850,007 A | 7/1989 | Marino et al. |
| 4,977,594 A | 12/1990 | Shear |
| 5,027,400 A | 6/1991 | Baji et al. |
| 5,029,104 A | 7/1991 | Dodson et al. |
| 5,093,718 A | 3/1992 | Hoarty et al. |
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahar et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |

(56) References Cited

U.S. PATENT DOCUMENTS

| | | |
|---|---|---|
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,092 A | 11/1998 | Boudreau et al. |
| 5,835,722 A | 11/1998 | Bradshaw et al. |
| 5,838,458 A | 11/1998 | Tsai |
| 5,848,246 A | 12/1998 | Gish |
| 5,848,396 A | 12/1998 | Gerace |
| 5,848,397 A | 12/1998 | Marsh et al. |
| 5,850,352 A | 12/1998 | Moezzi et al. |
| 5,850,433 A | 12/1998 | Rondeua |
| 5,854,897 A | 12/1998 | Radziewicz et al. |
| 5,855,008 A | 12/1998 | Goldhaber et al. |
| 5,861,880 A | 1/1999 | Shimizu et al. |
| 5,861,883 A | 1/1999 | Cuomo et al. |
| 5,862,260 A | 1/1999 | Rhoads |
| 5,862,325 A | 1/1999 | Reed et al. |
| 5,864,823 A | 1/1999 | Levitan |
| 5,870,769 A | 2/1999 | Freund |
| 5,872,850 A | 2/1999 | Klein et al. |
| 5,875,296 A | 2/1999 | Shi et al. |
| 5,877,766 A | 3/1999 | Bates et al. |
| 5,878,231 A | 3/1999 | Baehr et al. |
| 5,883,955 A | 3/1999 | Ronning |
| 5,884,025 A | 3/1999 | Baehr et al. |
| 5,886,683 A | 3/1999 | Tognazzini et al. |
| 5,887,133 A | 3/1999 | Brown et al. |
| 5,890,152 A | 3/1999 | Rapaport et al. |
| 5,892,917 A | 4/1999 | Myerson |
| 5,893,053 A | 4/1999 | Trueblood |
| 5,893,118 A | 4/1999 | Sonderegger |
| 5,894,554 A | 4/1999 | Lowery et al. |
| 5,897,622 A | 4/1999 | Blinn et al. |
| 5,898,434 A | 4/1999 | Small et al. |
| 5,901,287 A | 5/1999 | Bull et al. |
| 5,903,892 A | 5/1999 | Hoffert et al. |
| 5,905,492 A | 5/1999 | Straub et al. |
| 5,905,800 A | 5/1999 | Moskowitz et al. |
| 5,907,838 A | 5/1999 | Miyasaka et al. |
| 5,913,040 A | 6/1999 | Rakavy et al. |
| 5,918,012 A | 6/1999 | Astiz et al. |
| 5,918,013 A | 6/1999 | Mighdoll et al. |
| 5,918,014 A | 6/1999 | Robinson |
| 5,918,214 A | 6/1999 | Perkowski |
| 5,920,697 A | 7/1999 | Masters et al. |
| 5,923,845 A | 7/1999 | Kamiya et al. |
| 5,923,853 A | 7/1999 | Danneels |
| 5,929,850 A | 7/1999 | Broadwin et al. |
| 5,930,446 A | 7/1999 | Kanda |
| 5,930,700 A | 7/1999 | Pepper et al. |
| 5,930,801 A | 7/1999 | Falkenhainer et al. |
| 5,931,901 A | 8/1999 | Wolfe et al. |
| 5,931,907 A | 8/1999 | Davies et al. |
| 5,933,811 A | 8/1999 | Angles et al. |
| 5,933,832 A | 8/1999 | Suzuoka et al. |
| 5,936,679 A | 8/1999 | Kasahara et al. |
| 5,937,037 A | 8/1999 | Kamel et al. |
| 5,937,390 A | 8/1999 | Hyodo |
| 5,937,392 A | 8/1999 | Alberts |
| 5,937,411 A | 8/1999 | Becker |
| 5,943,478 A | 8/1999 | Aggarwal et al. |
| 5,944,791 A | 8/1999 | Scherpbier |
| 5,946,646 A | 8/1999 | Schena et al. |
| 5,946,664 A | 8/1999 | Ebisawa |
| 5,946,697 A | 8/1999 | Shen |
| 5,948,061 A | 9/1999 | Merriman et al. |
| 5,951,300 A | 9/1999 | Brown |
| 5,956,693 A | 9/1999 | Geerlings |
| 5,956,716 A | 9/1999 | Kenner et al. |
| 5,958,008 A | 9/1999 | Pogrebisky et al. |
| 5,958,015 A | 9/1999 | Dascalu |
| 5,959,621 A | 9/1999 | Nawaz et al. |
| 5,959,623 A | 9/1999 | Nav Hoff et al. |
| 5,960,409 A | 9/1999 | Wexler |
| 5,961,593 A | 10/1999 | Gabber et al. |
| 5,961,602 A | 10/1999 | Thompson et al. |
| 5,961,603 A | 10/1999 | Kunkel et al. |
| 5,963,909 A | 10/1999 | Warren et al. |
| 5,963,915 A | 10/1999 | Kirsch |
| 5,966,121 A | 10/1999 | Hubbell et al. |
| 5,970,473 A | 10/1999 | Gerszberg et al. |
| 5,974,219 A | 10/1999 | Fujita et al. |
| 5,974,451 A | 10/1999 | Simmons |
| 5,978,807 A | 11/1999 | Mano et al. |
| 5,978,833 A | 11/1999 | Pashley et al. |
| 5,978,836 A | 11/1999 | Ouchi |
| 5,978,841 A | 11/1999 | Berger |
| 5,978,842 A | 11/1999 | Noble et al. |
| 5,983,227 A | 11/1999 | Nazem et al. |
| 5,983,244 A | 11/1999 | Nation |
| 5,983,268 A | 11/1999 | Freivald et al. |
| 5,987,466 A | 11/1999 | Greer et al. |
| 5,987,606 A | 11/1999 | Cirasole et al. |
| 5,991,735 A | 11/1999 | Gerace |
| 5,991,799 A | 11/1999 | Yen et al. |
| 5,995,597 A | 11/1999 | Woltz et al. |
| 5,995,943 A | 11/1999 | Bull et al. |
| 5,996,007 A | 11/1999 | Klug et al. |
| 5,996,011 A | 11/1999 | Humes |
| 5,999,526 A | 12/1999 | Garland et al. |
| 5,999,731 A | 12/1999 | Yellin et al. |
| 5,999,740 A | 12/1999 | Rowley |
| 5,999,912 A | 12/1999 | Wodarz et al. |
| 6,002,401 A | 12/1999 | Baker |
| 6,006,241 A | 12/1999 | Purnaveja et al. |
| 6,006,252 A | 12/1999 | Wolfe |
| 6,006,265 A | 12/1999 | Rangan et al. |
| 6,009,236 A | 12/1999 | Mishima et al. |
| 6,009,409 A | 12/1999 | Adler et al. |
| 6,009,410 A | 12/1999 | LeMole et al. |
| 6,011,537 A | 1/2000 | Slotznick |
| 6,012,083 A | 1/2000 | Savitzky et al. |
| 6,014,502 A | 1/2000 | Moraes |
| 6,014,638 A | 1/2000 | Burge et al. |
| 6,014,698 A | 1/2000 | Griffiths |
| 6,014,711 A | 1/2000 | Brown |
| 6,016,509 A | 1/2000 | Dedrick |
| 6,020,884 A | 2/2000 | MacNaughton et al. |
| 6,023,726 A | 2/2000 | Saksena |
| 6,025,837 A | 2/2000 | Matthews, III et al. |
| 6,025,886 A | 2/2000 | Koda |
| 6,026,368 A | 2/2000 | Brown et al. |
| 6,026,413 A | 2/2000 | Challenger et al. |
| 6,026,433 A | 2/2000 | D'arlach et al. |
| 6,026,933 A | 2/2000 | King et al. |
| 6,029,045 A | 2/2000 | Picco et al. |
| 6,029,141 A | 2/2000 | Bezos et al. |
| 6,029,145 A | 2/2000 | Barritz |
| 6,029,182 A | 2/2000 | Nehab et al. |
| 6,029,195 A | 2/2000 | Herz |
| 6,035,332 A | 3/2000 | Ingrassia, Jr. et al. |
| 6,047,318 A | 4/2000 | Becker et al. |
| 6,047,327 A | 4/2000 | Tso et al. |
| 6,049,821 A | 4/2000 | Theriault et al. |
| 6,052,709 A | 4/2000 | Paul |
| 6,052,717 A | 4/2000 | Reynolds et al. |
| 6,052,730 A | 4/2000 | Felciano et al. |
| 6,055,572 A | 4/2000 | Saksena |
| 6,058,141 A | 5/2000 | Barger et al. |
| 6,061,054 A | 5/2000 | Jolly |
| 6,061,659 A | 5/2000 | Murray |
| 6,061,716 A | 5/2000 | Moncreiff |
| 6,065,024 A | 5/2000 | Renshaw |
| 6,065,056 A | 5/2000 | Bradshaw et al. |
| 6,067,559 A | 5/2000 | Allard et al. |
| 6,067,561 A | 5/2000 | Dillon |
| 6,067,565 A | 5/2000 | Horvitz |
| 6,070,140 A | 5/2000 | Tran |
| 6,073,105 A | 6/2000 | Sutcliffe et al. |
| 6,073,167 A | 6/2000 | Poulton et al. |
| 6,073,241 A | 6/2000 | Rsenberg et al. |

(56) References Cited

U.S. PATENT DOCUMENTS

| | | |
|---|---|---|
| 6,076,166 A | 6/2000 | Moshfeghi et al. |
| 6,078,916 A | 6/2000 | Culliss |
| 6,081,840 A | 6/2000 | Zhao |
| 6,084,581 A | 7/2000 | Hunt |
| 6,085,193 A | 7/2000 | Malkin et al. |
| 6,085,226 A | 7/2000 | Horvitz |
| 6,085,242 A | 7/2000 | Cjamdra |
| 6,088,731 A | 7/2000 | Kiraly et al. |
| 6,091,411 A | 7/2000 | Straub et al. |
| 6,092,196 A | 7/2000 | Reiche |
| 6,094,655 A | 7/2000 | Rogers et al. |
| 6,094,677 A | 7/2000 | Capek et al. |
| 6,098,064 A | 8/2000 | Pirolli et al. |
| 6,098,065 A | 8/2000 | Skillen et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,112,246 A | 8/2000 | Horbal et al. |
| 6,115,680 A | 9/2000 | Coffee et al. |
| 6,119,098 A | 9/2000 | Guyot et al. |
| 6,119,165 A | 9/2000 | Li et al. |
| 6,122,632 A | 9/2000 | Botts et al. |
| 6,125,388 A | 9/2000 | Reisman |
| 6,128,655 A | 10/2000 | Fields et al. |
| 6,128,663 A | 10/2000 | Thomas |
| 6,133,912 A | 10/2000 | Montero |
| 6,133,918 A | 10/2000 | Conrad et al. |
| 6,134,380 A | 10/2000 | Kushizaki |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyte |
| 6,144,944 A | 11/2000 | Kurtzman, II et al. |
| 6,151,596 A | 11/2000 | Hosomi |
| 6,154,738 A | 11/2000 | Call |
| 6,154,771 A | 11/2000 | Rangan et al. |
| 6,157,924 A | 12/2000 | Austin |
| 6,157,946 A | 12/2000 | Itakura et al. |
| 6,161,112 A | 12/2000 | Cragun et al. |
| 6,163,778 A | 12/2000 | Fogg et al. |
| 6,167,438 A | 12/2000 | Yates et al. |
| 6,167,453 A | 12/2000 | Becker et al. |
| 6,178,443 B1 | 1/2001 | Lin |
| 6,178,461 B1 | 1/2001 | Chan et al. |
| 6,182,066 B1 | 1/2001 | Marques |
| 6,182,097 B1 | 1/2001 | Hansen et al. |
| 6,182,122 B1 | 1/2001 | Berstis |
| 6,182,133 B1 | 1/2001 | Horvitz |
| 6,183,366 B1 | 2/2001 | Goldberg et al. |
| 6,185,558 B1 | 2/2001 | Bowman |
| 6,185,586 B1 | 2/2001 | Judson |
| 6,185,614 B1 | 2/2001 | Cuomo et al. |
| 6,191,782 B1 | 2/2001 | Mori et al. |
| 6,192,380 B1 | 2/2001 | Light et al. |
| 6,195,622 B1 | 2/2001 | Altschuler et al. |
| 6,198,906 B1 | 3/2001 | Boetje et al. |
| 6,199,079 B1 | 3/2001 | Gupta et al. |
| 6,202,093 B1 | 3/2001 | Bolam et al. |
| 6,204,840 B1 | 3/2001 | Petelcyky et al. |
| 6,208,339 B1 | 3/2001 | Atlas et al. |
| 6,216,141 B1 | 4/2001 | Straub et al. |
| 6,216,212 B1 | 4/2001 | Challenger et al. |
| 6,219,676 B1 | 4/2001 | Reiner |
| 6,222,520 B1 | 4/2001 | Gerszberg et al. |
| 6,223,215 B1 | 4/2001 | Hunt et al. |
| 6,233,564 B1 | 5/2001 | Schulze, Jr. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,266,058 B1 | 7/2001 | Meyer |
| 6,269,361 B1 | 7/2001 | Davis et al. |
| 6,275,854 B1 | 8/2001 | Himmel et al. |
| 6,279,112 B1 | 8/2001 | O'Toole et al. |
| 6,280,043 B1 | 8/2001 | Ohkawa |
| 6,285,987 B1 | 9/2001 | Roth et al. |
| 6,286,043 B1 | 9/2001 | Cuomo et al. |
| 6,286,045 B1 | 9/2001 | Griffiths et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schema et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,353,834 B1 | 3/2002 | Wong et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,735 B1 | 4/2002 | Hunt |
| 6,381,742 B2 | 4/2002 | Forbes et al. |
| 6,385,592 B1 | 5/2002 | Angles et al. |
| 6,392,668 B1 | 5/2002 | Murray |
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,421,729 B1 | 7/2002 | Paltenghe et al. |
| 6,434,745 B1 | 8/2002 | Conley, Jr. et al. |
| 6,437,802 B1 | 8/2002 | Kenny |
| 6,438,215 B1 | 8/2002 | Skladman et al. |
| 6,438,578 B1 | 8/2002 | Schmid et al. |
| 6,438,579 B1 | 8/2002 | Hosken |
| 6,441,832 B1 | 8/2002 | Tao et al. |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,452,612 B1 | 9/2002 | Holtz et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,484,148 B1 | 11/2002 | Boyd |
| 6,487,538 B1 | 11/2002 | Gupta et al. |
| 6,490,722 B1 | 12/2002 | Barton et al. |
| 6,493,702 B1 | 12/2002 | Adar et al. |
| 6,496,931 B1 | 12/2002 | Rajchel et al. |
| 6,499,052 B1 | 12/2002 | Hoang et al. |
| 6,502,076 B1 | 12/2002 | Smith |
| 6,505,201 B1 | 1/2003 | Haitsuka |

(56) References Cited

U.S. PATENT DOCUMENTS

| | | |
|---|---|---|
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,526,411 B1 | 2/2003 | Ward |
| 6,529,903 B2 | 3/2003 | Smith et al. |
| 6,539,375 B2 | 3/2003 | Kawasaki |
| 6,539,424 B1 | 3/2003 | Dutta |
| 6,564,202 B1 | 5/2003 | Schuetze et al. |
| 6,567,850 B1 | 5/2003 | Freishtat et al. |
| 6,567,854 B1 | 5/2003 | Olshansky et al. |
| 6,570,595 B2 | 5/2003 | Porter |
| 6,572,662 B2 | 6/2003 | Manohar et al. |
| 6,584,479 B2 | 6/2003 | Chang et al. |
| 6,584,492 B1 | 6/2003 | Cezar et al. |
| 6,584,505 B1 | 6/2003 | Howard et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,606,652 B1 | 8/2003 | Cohn et al. |
| 6,615,247 B1 | 9/2003 | Murphy |
| 6,622,168 B1 | 9/2003 | Datta |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,741 B1 | 4/2004 | Eyal et al. |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Phillippe et al. |
| 6,892,181 B1 | 5/2005 | Megiddo et al. |
| 6,892,223 B1 | 5/2005 | Kawabata et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 | 1/2006 | Miyasaka |
| 6,993,532 B1 | 1/2006 | Platt et al. |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg et al. |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin et al. |
| 7,194,425 B2 | 3/2007 | Nyhan |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson et al. |
| 7,451,065 B2 | 11/2008 | Pednault et al. |
| 7,454,364 B2 | 11/2008 | Shkedi |
| 7,464,155 B2 | 12/2008 | Mousavi et al. |
| 7,512,603 B1 | 3/2009 | Veteska et al. |
| 7,630,986 B1 | 12/2009 | Herz |
| 7,743,340 B2 | 6/2010 | Horvitz et al. |
| 7,844,488 B2 | 11/2010 | Merriman et al. |
| 7,930,207 B2 * | 4/2011 | Merriman et al. .......... 705/14.66 |
| 8,160,925 B2 * | 4/2012 | Anand et al. ................ 705/14.49 |
| 8,195,508 B1 * | 6/2012 | Calder et al. ................. 705/14.1 |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |

(56) References Cited

U.S. PATENT DOCUMENTS

| | | |
|---|---|---|
| 2002/0040374 A1 | 4/2002 | Kent |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0087499 A1 | 7/2002 | Stockfisch |
| 2002/0087621 A1 | 7/2002 | Hendriks |
| 2002/0091700 A1 | 7/2002 | Steele et al. |
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099767 A1 | 7/2002 | Cohen et al. |
| 2002/0099812 A1 | 7/2002 | Davis et al. |
| 2002/0099824 A1 | 7/2002 | Bender et al. |
| 2002/0103811 A1 | 8/2002 | Fankhauser et al. |
| 2002/0107585 A1 | 8/2002 | Lundahl et al. |
| 2002/0107847 A1 | 8/2002 | Johnson |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128908 A1 | 9/2002 | Levin et al. |
| 2002/0128925 A1 | 9/2002 | Angeles |
| 2002/0152121 A1 | 10/2002 | Hiroshi |
| 2002/0152126 A1 | 10/2002 | Lieu et al. |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Kranoiarov et al. |
| 2002/0169670 A1 | 11/2002 | Barsade et al. |
| 2002/0169762 A1 | 11/2002 | Cardona |
| 2002/0170068 A1 | 11/2002 | Rafey et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2002/0198778 A1 | 12/2002 | Landsman et al. |
| 2003/0004804 A1 | 1/2003 | Landsman et al. |
| 2003/0005000 A1 | 1/2003 | Landsman et al. |
| 2003/0005067 A1 | 1/2003 | Martin et al. |
| 2003/0005134 A1 | 1/2003 | Martin et al. |
| 2003/0011639 A1 | 1/2003 | Webb |
| 2003/0014304 A1 | 1/2003 | Calvert et al. |
| 2003/0014399 A1 | 1/2003 | Hansen et al. |
| 2003/0018778 A1 | 1/2003 | Martin et al. |
| 2003/0018885 A1 | 1/2003 | Landsman et al. |
| 2003/0023481 A1 | 1/2003 | Calvert et al. |
| 2003/0023488 A1 | 1/2003 | Landsman et al. |
| 2003/0023698 A1 | 1/2003 | Dieberger et al. |
| 2003/0028529 A1 | 2/2003 | Cheung et al. |
| 2003/0028565 A1 | 2/2003 | Landsman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0040958 A1 | 2/2003 | Fernandes |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0052913 A1 | 3/2003 | Barile |
| 2003/0074448 A1 | 4/2003 | Kinebuchi |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0115157 A1 | 6/2003 | Circenis |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0135853 A1 | 7/2003 | Goldman et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0176931 A1 | 9/2003 | Pednault et al. |
| 2003/0182184 A1 | 9/2003 | Strasnick et al. |
| 2003/0195837 A1 | 10/2003 | Kostic et al. |
| 2003/0195877 A1 | 10/2003 | Ford et al. |
| 2003/0206720 A1 | 11/2003 | Abecassis |
| 2003/0208472 A1 | 11/2003 | Pham |
| 2003/0220091 A1 | 11/2003 | Farrand et al. |
| 2003/0221167 A1 | 11/2003 | Goldstein et al. |
| 2003/0229542 A1 | 12/2003 | Morrisroe |
| 2004/0002896 A1 | 1/2004 | Alanen et al. |
| 2004/0024756 A1 | 2/2004 | Rickard |
| 2004/0030798 A1 | 2/2004 | Anderson et al. |
| 2004/0044677 A1 | 3/2004 | Huper-Graff et al. |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0117353 A1 | 6/2004 | Ishag |
| 2004/0133845 A1 | 7/2004 | Forstall et al. |
| 2004/0162738 A1 | 8/2004 | Sanders et al. |
| 2004/0162759 A1 | 8/2004 | Willis |
| 2004/0163101 A1 | 8/2004 | Swix et al. |
| 2004/0167928 A1 | 8/2004 | Anderson et al. |
| 2004/0181525 A1 | 9/2004 | Itzhak et al. |
| 2004/0181604 A1 | 9/2004 | Immonen |
| 2004/0193488 A1 | 9/2004 | Khoo et al. |
| 2004/0210533 A1 | 10/2004 | Picker et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0254810 A1 | 12/2004 | Yamaga et al. |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027821 A1 | 2/2005 | Alexander et al. |
| 2005/0027822 A1 | 2/2005 | Plaza |
| 2005/0033657 A1 | 2/2005 | Herrington et al. |
| 2005/0038819 A1 | 2/2005 | Hicken et al. |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0102282 A1 | 5/2005 | Linden |
| 2005/0125382 A1 | 6/2005 | Karnawat et al. |
| 2005/0131762 A1 | 6/2005 | Bharat et al. |
| 2005/0132267 A1 | 6/2005 | Aviv |
| 2005/0149404 A1 | 7/2005 | Barnett et al. |
| 2005/0155031 A1 | 7/2005 | Wang et al. |
| 2005/0182773 A1 | 8/2005 | Feinsmith |
| 2005/0187823 A1 | 8/2005 | Howes |
| 2005/0203796 A1 | 9/2005 | Anand et al. |
| 2005/0204148 A1 | 9/2005 | Mayo |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0240599 A1 | 10/2005 | Sears |
| 2005/0273463 A1 | 12/2005 | Zohar et al. |
| 2005/0289120 A9 | 12/2005 | Soulanille et al. |
| 2006/0015390 A1 | 1/2006 | Rijsinghani et al. |

(56) References Cited

U.S. PATENT DOCUMENTS

| | | | |
|---|---|---|---|
| 2006/0026233 | A1 | 2/2006 | Tenembaum et al. |
| 2006/0031253 | A1 | 2/2006 | Newbold et al. |
| 2006/0053230 | A1 | 3/2006 | Montero |
| 2006/0136524 | A1 | 6/2006 | Wohlers et al. |
| 2006/0136528 | A1 | 6/2006 | Martin et al. |
| 2006/0136728 | A1 | 6/2006 | Gentry et al. |
| 2006/0235965 | A1 | 10/2006 | Bennett et al. |
| 2006/0253432 | A1 | 11/2006 | Eagle et al. |
| 2007/0016469 | A1 | 1/2007 | Bae et al. |
| 2007/0038956 | A1 | 2/2007 | Morris |

FOREIGN PATENT DOCUMENTS

| | | |
|---|---|---|
| EP | 1045547 | 10/2000 |
| EP | 1154611 | 11/2001 |
| EP | 1207468 | 5/2002 |
| JP | 343825 | 2/1991 |
| JP | 11066099 | 3/1999 |
| JP | 2001084256 | 3/2001 |
| JP | 2001147894 | 5/2001 |
| JP | 20010222535 | 8/2001 |
| JP | 2001312482 | 11/2001 |
| JP | 2002024221 | 1/2002 |
| JP | 2002032401 | 1/2002 |
| JP | 2002073545 | 3/2002 |
| JP | 2002259371 | 9/2002 |
| JP | 2002334104 | 11/2002 |
| JP | 2003058572 | 2/2003 |
| JP | 2003141155 | 5/2003 |
| JP | 2003178092 | 6/2003 |
| JP | 20030271647 | 9/2003 |
| JP | 2004355376 | 12/2004 |
| WO | 9847090 | 10/1998 |
| WO | 9938321 | 7/1999 |
| WO | 9944159 | 9/1999 |
| WO | 9946701 | 9/1999 |
| WO | 9955066 | 10/1999 |
| WO | 9959097 | 11/1999 |
| WO | 0004434 | 1/2000 |
| WO | 0054201 | 9/2000 |
| WO | 0103028 | 1/2001 |
| WO | 0115052 | 3/2001 |
| WO | 0139024 | 5/2001 |
| WO | 0144992 | 6/2001 |
| WO | 0163472 | 8/2001 |
| WO | 0169929 | 9/2001 |
| WO | 0190917 | 11/2001 |
| WO | 0244869 | 6/2002 |
| WO | 03010685 | 2/2003 |

OTHER PUBLICATIONS

International Search Report in PCT Appln. No. PCT/US2004/07714, mailed Mar. 31, 2005 [1 page].
Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May 1999 (in Conf. Proc. 8th Intl WWW Conf., Toronto, Canada, May 11-14, 1999).
Privacy and Electronic Communications (EC Directive) Regulations 2003 (PECR), No. 2426, Electronic Communication, Sep. 2003.
U.S. Appl. No. 11/427,243—May 10, 2011 PTO Office Action.
Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.
Ad Close, Webpage [online]. C/net Downloads.com [retrieved on Oct. 4, 2001]. Retrieved from the Internet <URL http//download.cnet.com/downloads/0-10059-100-915154. html>.
Ad Muncher, Webpage [online]. C/net Downloads.com [retrieved on Oct. 4, 2001]. Retrieved from the Internet <URL:http//download.cnet.com/downloads/0-33567-18 100-2750044. html>.

AdDelete, Webpage [online]. C/net Download.com [retrieved on Oct. 4, 2001]. Retrieved from the Internet <URL:http//download.cnet.com/downloads/0-10059-100-7003126. html>.
Adextinguisher—Introduction and News Sections. Webpage [online][retrieved on Oct. 4, 2001]. Retrieved from the Internet URL:http//adext.magenet.net.html.
AdPurger, Webpage [online]. C/net Downloads.com [retrieved on Oct. 4, 2001]. Retrieved from the Internet <URL:http//download.cnet.com/downloads/0-10068-100-5067717.html>.
AdsOff, Webpage [online]. C/net Downloads.com [retrieved on Oct. 3, 2001]. Retrieved from the Internet <URL:http//download.cnet.com/downloads/0-10059-100-9 12651.html>.
AdSubract SE, Webpage [online]. C/net Downloads.com [retrieved on Oct. 4, 2001]. Retrieved from the Internet <URL:http//download.cnet.com/downloads/0-3356727-100-5963713. html>.
Advertising Killer, Webpage [online]. C/net Downloads.com [retrieved on Oct. 3, 2001]. Retrieved from the Internet <URL.http//download.cnet.com/downloads/0-10059-100-1539520.html>.
Advisory Action dated Nov. 19, 2008 issued in U.S. Appl. No. 11/015,583, 3 pages.
AllGone, Webpage [online]. C/net Downloads.com [retrieved on Oct. 4, 2001]. Retrieved from the Internet <URL:http//download.cnet.com/downloads/0-10068-100-2915974.html>.
AnalogX Pow, Webpage [online]. C/net Downloads.com [retrieved on Oct. 3, 2001]. Retrieved from the Internet <URL:http//download.cnet com/downloads-0-3356748100-915372.html>.
Banner Zapper, Webpage [online]. C/net Downloads.com [retrieved on Oct. 4, 2001]. Retrieved from the Internet <URL:http//download.cnet.com/downloads/0-3356727-100-6384611.html>.
BanPopup, Webpage [online]. C/net Downloads.com [retrieved on Oct. 4, 2001] . Retrieved from the Internet <URL:http/ /download.cnet.com/downloads/0-10059-100-6901908.html>.
Black List. Webpage [online]. C/net Downloads.com [retrieved on Oct. 4, 2001]. Retrieved from the Internet <URL.http/download cnet.com/downloads/0-10059-100902347 html>.
Claria—Company Information—Corporate Review, webpage [online], retrieved on Mar. 3, 2005, retrieved from the internet: <URL:http://www.claria.com/companyinfo.html>.
Close Popup 4.0, Webpage [online]. Take a Hike Software [retrieved on Oct. 4, 2001]. Retrieved from the Internet <URL:http//www.ryanware.com/close popup.html>.
Close Popup, Webpage [online]. C/net Downloads.com [retrieved on Oct. 4, 2001]. Retrieved from the Internet <URL:http//download.cnet.com/downloads/0-10059-100-905799.html>.
CobraSoft PopStop, Webpage (online). C/net Downloads.com [retrieved on Oct. 4, 2001]. Retrieved from the Internet <URL:http//download cnet.com/downloads/0-10058-100-6926765.html>.
Compare Prices and Read Reviews on AdsOff! Epenions.com. Webpage [online]; Jan. 21, 2001. Obtained from corresponding International Application PCT Search Report.
CrushPop 2000, Webpage [online]. www.32bit.com [retrieved on Oct. 4, 2001]. Retrieved from the Internet <URL.http//32bit.com/software/listings/Internet/Special/ 180P113794.html>.
Definition of "close button", Microsoft Press Computer Dictionary, 3rd ed. (Redmond WA: Microsoft Press, 1997).
DoubleClick products (17 total pgs); Webpage [online] [retrieved on Jun. 11, 2003]; Retrieved from the Internet: <UR: http://www.doubleclick.com>.
Final Office Action dated Mar. 26, 2010 issued in U.S. Appl. No. 11/207,590, 8 pages.
Final Rejection dated May 21, 2008 issued in U.S. Appl. No. 11/015,583, 8 pages.
Google search for "define: close button", Mar. 2, 2007.
Heller, Laura, "Target gets mod in Manhattan", DSNRetailing Today, v40 n16, Aug. 20, 2001: 2, 37.
InterMute, Webpage [online]. C/net Downloads.com [retrieved on Oct. 3, 2001]. Retrieved from the Internet <URL:http//download.cnet.com/downloads/0-10059-100-906599.html>.
International Preliminary Report on Patentability in•PCT Appin. No. PCT/US2004/07714, dated Oct. 1, 2005 [4 pages].

(56) References Cited

OTHER PUBLICATIONS

Internet Citation: "Gator.com offers one-click shopping at over 5,000 e- commerce site today"; Jun. 14, 1999; XP002145278; Date retrieved: Jun. 28, 2001. URL:http://www.gatorcom/company/press/pr061499b.html.
Kourbatov, Opening a Window, Jul. 8, 2000, plublished by www.javascripter.net, whole document.
Marcebra Net, Webpage [online]. C/net Downloads.com [retrieved on Oct. 4, 2001]. Retrieved from the Internet <URL:http//download.cnet.com/downloads/0-3364666-100-5210875.html>.
Mr. KillAd. Webpage [online]. C/net Downloads.com [retrieved on Oct. 4, 2001]. Retrieved from the Internet <URL:http//download.cnet.com/downloads/0-10059-100-895339 html>.
Nagger, Webpage [online]. C/net Downloads.com [retrieved on Oct. 4, 2001]. Retrieved from the Internet <URL:http//download.cnet.com/downloads/0-3356748100-2497932 html>.
NoAds 2000.6.30.1, Webpage [online] south bay software [retrieved on Oct. 4, 2001]. Retrieved from the Internet <URL:http//www.southbaypc.com/NoAds.html>.
Non-Final Rejection dated Dec. 20, 2006 issued in U.S. Appl. No. 11/015,583, 8 pages.
Non-Final Rejection dated Jul. 20, 2009 issued in U.S. Appl. No. 11/015,583, 7 pages.
NoPops 1.1, Webpage [online]. WebAttack.com [retrieved on Oct. 4, 2001]. Retrieved from the Internet <URL:http//www.webattack.com/get/nopops.shtml>.
Paraben's AdStopper, Webpage [online]. C/net Downloads.com [retrieved on Oct. 4, 2001]. Retrieved from the Internet <URL:http//download.cnet.com/downloads/0-10059-100-2643648.html>.
PCT International Search Report for application No. PCT/US02/35981, 3 sheets; mailed Apr. 4, 2003.
PCT International Search Report for Application No. PCT/USO4/09918.
PCT International Search Report re: International Application No. PCT/US05/29615 dated Feb. 20, 2006.
Pierre Maret, et al.; Multimedia Information Interchange: Web Forms Meet Data Servers; Proceedings of the IEEE International Conference on Multimedia . Computing and Systems; vol. 2, Jun. 7-11, 1999, pp. 499-505; XP000964627; Florence, Italy.
Popki Popup Closer 1.4, Webpage [online]. WebAttack.com [retrieved on Oct. 4, 2001]. Retrieved from the Internet <URL:http//www.webattack.com/get/popki.shtml>. •.
PopKill, Webpage [online]. C/net Downloads.com [retrieved on Oct. 4, 2001]. Retrieved from the Internet <URL:http//download.cnet.com/downloads/0-10059-100-6967054.html>.
PopNot, Webpage [online]. C/net Downloads.com [retrieved on Oct. 4, 2001]. Retrieved from the Internet <URL http//download.cnet.com/downloads/0-10059-100-5112702.html>.
PopUp Eraser, Webpage [online]. C/net Downloads.com [retrieved on Oct. 4, 2001]. Retrieved from the Internet <URL:http//download.cnet.com/downloads/0-10059-100-6322841. html>.
Popup Hunter, Webpage [online]. C/net Downloads.com [retrieved on Oct. 4, 2001]. Retrieved from the Internet <URL:http//download.cnet.com/downloads/0-10059-100-1451171.html>.
PopUp Killer, Webpage [online]. C/net Downloads.com [retrieved on Oct. 3, 2001]. Retrieved from the Internet <URL.http//download.cnet.com/downloads/0-10059-100-7253644 html>.
Popup Smasher, Webpage [online]. C/net Downloads.com [retrieved on Oct. 4, 2001]. Retrieved from the Internet <URL:http/download.cnet.com/downloads/0-3364664-100-7209048.html>.
Pop-up stopper, Webpage [online]. C/net Downloads.com [retrieved on Oct. 3, 2001]. Retrieved from the Internet <URL:http//download.cnet.com/downloads/0-10059-100-6803957.sub.--html&- gt.
PopupDummy, Webpage [online]. C/net Downloads.com [retrieved on Oct. 4, 2001]. Retrieved from the Internet <URL:http//download.cnet.com/downloads/0-10059-100-6943327.html>.
Ready, Kevin et al., "Plug-n-Play Java Script" (Indianapolis, IN: New Riders Publishing, 1996): 19-22, 39, 40 and 43-45.
Restriction Requirement dated Oct. 31, 2007 issued in U.S. Appl. No. 11/015,583, 6 pages.

Surf in Peace 2.01, Webpage [online]. WebAttack.com [retrieved on Oct. 4, 2001]. Retrieved from the Internet <URL:http//www.webattack.com/get/sip.shtml>.
U.S. Appl. No. 09/993,887, filed Nov. 27, 2001, by Jax B. Cowden, et al.
U.S. Appl. No. 09/993,904, filed Nov. 27, 2001, by Jax B. Cowden, et al.
U.S. Appl. No. 09/993,906, filed Nov. 27, 2001, by Jax B. Cowden, et al.
U.S. Appl. No. 10/061,107—Apr. 18, 2011 PTO Office Action.
U.S. Appl. No. 11/210,209—Oct. 16, 2007 Office Action.
U.S. Appl. No. 11/211,197—Jun. 23, 2006 PTO Office Action.
U.S. Appl. No. 09/993,888, filed Nov. 27, 2001, by Mark E. Pennell, et al.
Web Magician, Webpage [online]. RocketDownLoad.com [retrieved on Oct. 4, 2001]. Retrieved from the Internet <URL:http/www.rocketdownload.com/Details/Inte/webmag.html>.
Written Opinion in PCT Appin. No. PCT/US2004/07714, mailed Mar. 31, 2005 [3 pages].
www.conversionruler.com/faq.php, Feb. 4, 2003.
Zero Popup, Webpage [online]. C/net Downloads.com [retrieved on Oct. 4, 2001]. Retrieved from the Internet <URL:http//download.cnet.com/downloads/0-3356748-100-7163307.html>.
EPO Communication in European Appin. No. 04795209, mailed Feb. 17, 2011 [160 pages].
EPO Communication in European Appin. No. 04795209, mailed Feb. 17, 2011 [4 pages].
EPO File History of EP 2004795209, downloaded from European Patent Office on Apr. 13, 2011 [164 pgs.].
EPO, File history of EP 2004794999, downloaded from EPO Apr. 13, 2011 [204 pgs.].
EPO, File history of EP1714221 (downloaded from EPO on Apr. 13, 2011) [139 pages].
KIPO, Official Action in Korean Patent Appin. No. 10-2006-7008977.
WIPO, International Preliminary Report on Patentability (Chap. I of PCT) for PCT/USO4/33777, Jan. 23, 2006 [4 pgs].
WIPO, International Preliminary Report on Patentability (Chap. I of PCT) for PCT/US05/01022, Aug. 14, 2006 [6 pgs].
WIPO, International Search Report for PCT/USO4/33777, Jan. 19, 2006 [3 pgs.].
WIPO, International Search Report for PCT/US05/01022, Apr. 24, 2006 [3 pgs.].
WIPO, Written Opinion of the International Searching Authority for PCT/USO4133777, Jan. 23, 2006 [3 pgs].
WIPO, Written Opinion of the International Searching Authority for PCT/US05/01022, Apr. 26, 2006 [5 pgs].
ACM Portal USPTO Search, "Communications of the ACM: vol. 52, Issue 1", Association for Computing Machinery, dated Jan. 2009, 1 page.
Aggarwal, Charu C. et al. 2001. Intelligent Crawling on the World Wide Web with Arbitrary Predicates. ACM, pp. 96-105.
Codelifter.com: JavaScript Index Windows and Frames. [online] [retrieved on Dec. 19, 2005]. Retrieved from the internet<URL://http://www.codeliftercom/main/javascript/index_windowframes.html>.
Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/en/index.html>.
Diligent!, Michelangelo et al. 2004. A Unified Probalistic Framework for Web Page Scoring Systems. IEEE, vol. 16, No. 1. Jan. 2004, pp. 4-16.
Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.
EPO Communication in European Appin. No. 02778589, completed Dec. 21, 2005 (2 Sheets).
EPO, Communication for EP 03 75 5344, Feb. 14, 2011 [4 pgs.].
EPO, File history of EP—03755344.3, Method and Apparatus for Displaying Messages in Computer Systems, as of Feb. 21, 2011 [121 pgs.].

(56) References Cited

OTHER PUBLICATIONS

EPO, Supplementary European Search Report for EP 03 75 5344, Jun. 30, 2009, mailed Jul. 10, 2009 [ 2 pgs.].
Favela, Jesus et al. 1997. Image-Retrieval Agent: Integrating Image Content and Text. IEE, vol. 1.14, pp. 36-39.
Google Search, "Result Search Query Build Search Engine Index Using Gather Consumer Navigate Search", http://scholar.google.com/scholar, dated Apr. 7, 2010, 3 pages.
Heinle et al. 1997. Designing with JavaScript: Creating Dynamic Web Pages.Sep. 1997, pp. 1-33, 46, 83.
Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04.
Hun, Ke et al. 2003. A Probabilistic Model for Intelligent Web Crawlers. IEEE, pp. 278-282.
International Preliminary Report on Patentability and Written Opinion in PCT Appin. No. PCT/US2004/033777, mailed Jan. 19, 2006.
International Preliminary Report on Patentability and Written Opinion in PCT Appin. No. PCT/US2005/001022, dated Apr. 26, 2006.
International Preliminary Report on Patentability in PCT Appin. No. PCT/US2006/008049, dated Nov. 6, 2007.
International Preliminary Report on Patentability in PCT Appin. No. PCT/US2006/008050, dated Nov. 6, 2007.
International Search Report and Written Opinion in PCT Appin. No. PCT/US2006/008049, mailed Oct. 19, 2007.
International Search Report and Written Opinion in PCT Appin. No. PCT/US2006/008050, mailed on Oct. 19, 2007.
International Search Report in EP Appin. No. 05802579.2-1527, dated May 2, 2008.
International Search Report in PCT Appin. No. PCT/US2004/033777, mailed Jan. 19, 2006.
International Search Report in PCT Appin. No. PCT/US2005/001022, mailed Apr. 24, 2006.
IRTORG—Internet Related Technologies. 2002. irt.org—JavaScript Windows FAQ Knowledge Base. Jun. 3, 2000. Webpage [online] [retrieved on Dec. 19, 2005]. Retrieved from the internet<URL:http://web.archive.org/web/20000619232700/developer.irt.org/script/.
Keys. 1998. Every Possible Internet Advertisement Drastic Increase of Click Through Rate by Interactivity and Multimedia. Nikkei Internet Technology. Dec. 22, 1998. January Issue (1999), vol. 18, pp. 118-127.
Leuski, Anton et al. 2000. Lighthouse: Showing the Way to Relevant Information. IEEE, Oct. 2000, pp. 125-129.
Metacrawler, Web Search Home Page—MetaCrawler, InfoSpace, Inc. 2004, p. 1 of 1 (retrieved on Apr. 6, 2004), Retrieved from the internet: <URL:http://www.metacrawlercom.html>.
Office Action mailed Nov. 2, 2005 from U.S. Appl. No. 10/061,107, filed Jan. 25, 2002.
Office Action mailed Oct. 10, 2007 from U.S. Appl. No. 11/207,590, filed Aug. 19, 2005.
Office Action mailed Aug. 13, 2003 from U.S. Appl. No. 10/061,107, filed Jan. 25, 2002.
Office Action mailed Sep. 13, 2006 from U.S. Appl. No. 10/700,820, filed Nov. 4, 2003.
Office Action mailed Jan. 14, 2004 in U.S. Appl. No. 10/061,107, filed Jan. 25, 2002.
Office Action mailed Oct. 16, 2008 from U.S. Appl. No. 11/207,590, filed Aug. 19, 2005.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jun. 22, 2009 from U.S. Appl. No. 11/207,590, filed Aug. 19, 2005.
Office Action mailed Jun. 24, 2008 from U.S. Appl. No. 11/207,592, filed Aug. 19, 2005.
Office Action mailed May 24, 2007 from U.S. Appl. No. 10/700,820, filed Nov. 4, 2003.
Office Action mailed Apr. 25, 2006 from U.S. Appl. No. 10/700,820, filed Nov. 4, 2003.
Office Action mailed Feb. 25, 2009 from U.S. Appl. No. 11/207,592, filed Aug. 19, 2005.
Office Action mailed Dec. 26, 2006 from U.S. Appl. No. 10/700,820, filed Nov. 4, 2003.
Office Action mailed Mar. 26, 2010 from U.S. Appl. No. 11/207,590, filed Aug. 19, 2005.
Office Action mailed Jul. 27, 2005 from U.S. Appl. No. 10/056,932, filed Jan. 25, 2002.
Office Action mailed Oct. 27, 2010 from U.S. Appl. No. 11/207,590, filed Aug. 19, 2005.
Office Action mailed Sep. 27, 2007 from U.S. Appl. No. 11/207,592, filed Aug. 19, 2005.
Office Action mailed Nov. 28, 2006 from U.S. Appl. No. 10/227,168, filed Aug. 23, 2002.
Office Action mailed Sep. 28, 2010 from U.S. Appl. No. 10/061,107, filed Jan. 25, 2002.
Office Action mailed Jul. 3, 2006 from U.S. Appl. No. 10/227,168, filed Aug. 23, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Office Action mailed Oct. 19, 2007 from U.S. Appl. No. 11/207,589, filed Aug. 19, 2005.
Offie Action mailed May 5, 2006 from U.S. Appl. No. 10/061,107, filed Jan. 25, 2002.
PCT International Preliminary Report on Patentability, dated Jan. 9, 2008, for International Application No. PCT/US06/023386.
Shopping with WhenUShop, Webpage [on-line]; WhenU.com [retrieved on Mar. 19, 2002]. Retrieved from the Internet: URL:http://www.whenu.com.
SideStep, The Travelers Search Engine; Webpage (online) (retrieved on Oct. 7, 2004); retrieved from the Internet: <URL:http://www.sidestep.com/main.html.
Smith, Lindsay I. 2002. A Tutorial on Principal Components Analysis. Feb. 26, 2002.
Soumen Chakrabarti et al., "Focused Crawling: A New Approach to Top-Specific Web Resource Discovery" Computer Networks 31 (1999), pp. 1623-1640.
Supplemental Notice of Allowability from U.S. Appl. No. 11/207,589, filed Aug. 19, 2005.
Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of Jun. 10 issue).
U.S. Appl. No. 11/420,191—Mar. 25, 2011 PTO Office Action.
UK Appin. No. 0724938.6—Feb. 16, 2011—UK IPO Decision of Rejection.
USPTO, Office Action in U.S. Appl. No. 11/688,160, mailed Feb. 16, 2011.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.
Claypool, et al., Inferring User Interest, Worcester Polytechnic Inst., IEEE Internet Computing, Nov.-Dec. 2001, pp. 32-39 [8 pgs.].
International Preliminary Report on Patentability and Written Opinion in PCT Appin. No. PCT/US2005/029615, mailed Mar. 9, 2006.
International Preliminary Report on Patentability and Written Opinion in PCT Appin. No. PCT/US2005/035352, mailed Sep. 11, 2007.
International Preliminary Report on Patentability and Written Opinion in PCT Appin. No. PCT/US2006/009954, mailed Aug. 30, 2006.
International Preliminary Report on Patentability and Written Opinion in PCT Appin. No. PCT/US2006/025102, mailed Jul. 26, 2007.
International Preliminary Report on Patentability and Written Opinion in PCT Appin. No. PCT/US2006/25103, mailed Jan. 1, 2008.
International Preliminary Report on Patentability and Written Opinion in PCT Appin. No. PCT/US2006/25104, mailed Jan. 23, 2007.
International Preliminary Report on Patentability and Written Opinion in PCT Appin. No. PCT/US2007/061944, mailed Feb. 14, 2008.
International Search Report in PCT Appin. No. PCT/US2005/029615, mailed Mar. 9, 2006.

(56) References Cited

OTHER PUBLICATIONS

International Search Report in PCT Appin. No. PCT/US2005/035352, mailed Sep. 11, 2007.
International Search Report in PCT Appin. No. PCT/US2006/009954, mailed Aug. 30, 2006.
International Search Report in PCT Appin. No. PCT/US2006/025102, mailed Jul. 26, 2007.
International Search Report in PCT Appin. No. PCT/US2006/25103, mailed Jan. 1, 2008.
International Search Report in PCT Appin. No. PCT/US2006/25104, mailed Jan. 23, 2007.
International Search Report in PCT Appin. No. PCT/US2007/061944, mailed Feb. 14, 2008.
Japanese Patent Office, Official Action issued Dec. 17, 2010, mailed Dec. 27, 2010 in Japanese Patent Application No. 2007-528053 (non-official translation), 7 pgs.
Montgomery, Alan et al., Learning About Customers Without Asking, Carnegie Mellon University, Tepper School of Business, Jan. 2002 [35 pgs.].
Payton, D., et al. 1999. Dynamic collaborator discovery in information intensive environments. ACM Comput. Surv. 31, 2es, Article 8 (Jun. 1999), pp. 1-8.
PCT International Search Report for PCT/US03/13985 mailed Aug. 8, 2003; total of 2 sheets.
Bae, Sung Min, et al., "Fuzzy Web Ad Selector", IEEE Intelligent Systems, vol. 18 Issue 6, Nov./Dec. 2003, pp. 62-69.
Broder, Alan J., Data Mining the Internet and Privacy, WEBKDD '99, LNAI 1836, Springer-Verlag, Berlin, Germany, (c) 2000, pp. 56-73.
Bucklin, Randolph E., et al., "Choice and the Internet: From Clickstream to Research Stream", Marketing Letters, vol. 13, No. 3, Aug. 2002, pp. 245-258.
Eick, Stephen G., "Visual Analysis of Website Browsing Patterns", Visual Interfaces to Digital Libraries, Springer-Verlag, Berlin, Germany, (c) 2002, pp. 65 77.
Eirinaki, Magdalini, et al., "Web Mining for Web Personalization", ACM Transactions on Internet Technology (TOIT), vol. 3, Issue 1, Feb. 2003, pp. 1-27.
Fenstermacher, Kurt D., et al., "Client-Side Monitoring for Web Mining", Journal of the American Society for Information Science and Technology, vol. 54, Issue 7, May 2003, pp. 625-637.
Fenstermacher, Kurt D., et al., "Mining Client-Side Activity for Personalization", WECWIS 2002, (c) 2002, pp. 205-212.
Friedman, Batya, et al., "Informed Consent in the Mozilla Browser: Implementing Value-Sensitive Design", HICSS-35 '02, Jan. 2002, pp. 10-19.
Fu, Xiaobin, et al., "Mining Navigation History for Recommendation", IUI 2000, New Orleans, LA, (c) 2000, pp. 106-112.
Gralla, Preston, How the Internet Works, Special Edition, Ziff-Davis Press, Emeryville, CA, .(c) 1997, pp. 254 and 266-271.
Greening, Dan R., "Tracking Users: What Marketers Really Want to Know", Web Techniques, Jul. 1999, downloaded from: www.webtechniques.com/archives/1999/07/, pp. 1-9.
International Search Report and Written Opinion of the International Search Authority for Intl. Appl. No. PCT/US05/45722 mailed Jan. 19, 2007.
Ishitani, Lucile, et al., "Masks: Bringing Anonymity and Personalization Together", IEEE Security & Privacy, vol. 1, Issue 3, May/Jun. 2003, pp. 18-23.
Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.
Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.
Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.
Lee, Ching-Cheng, "Category-Based Personalization System," COMPSAC 2001, Oct. 8-12, 2001, pp. 621-625, pp. 621 and 624.
Lee, Ching-Cheng, et al., "Category-Based Web Personalization System", COMPSAC 2001, Oct. 8-12, 2001, pp. 621-625.
Liu, Jian-Guo, et al., "Web Mining for Electronic Business Application", PDCAT 2003, Aug. 27-29, 2003, pp. 872-876.
Liu, Jian-Guo, et al., "Web Usage Mining for Electronic Business Applications", Machine Learning and Cybernetics, Shanghai, China, Aug. 2004, pp. 1314-1318.
Lu, Hongjun, et al., "Extending a Web Browser with Client-Side Mining", APWeb 2003, LNCS 2642, Springer-Verlag, Berlin, Germany, (c) 2003, pp. 166-177.
Luxenburger, Julia, et al., "Query-Log Based Authority Analysis for Web Information Search", WISE 2004, LNCS 3306, Springer-Verlag, Berlin, Germany, Nov. 1, 2004, pp. 90-101.
Mobasher, Bamshad, et al., "Automatic Personalization Based on Web Usage Mining", Communications of the ACM, vol. 43, Issue 8, Aug. 2000, pp. 142-151.
Otsuka, Shingo, et al. 2004. The Analysis of Users Behavior Using Global Web Access Logs. IPSJ SIG Technical Report, vol. 2004 No. 71 (Jul. 13, 2004), pp. 17 24.
Paepcke, Andreas, et al., "Beyond Document Similarity: Understanding Value Based Search and Browsing Technologies", ACM SIGMOD Record, vol. 29, Issue 1, Mar. 2000, pp. 80-92.
Paganelli, Leila, et al., "Intelligent Analysis of User Interactions with Web Applications", IUI '02, San Francisco, CA, Jan. 13-16, 2002, pp. 111-118.
Park, Joon S., et al., "Secure Cookies on the Web", IEEE Internet Computing, vol. 4, Issue 4, Jul./Aug. 2000, pp. 36-44.
Pierrakos, Dimitrios, et al., Web Usage Mining as a Tool for Personalization: A Survey, User Modeling and User-Adapted Interaction, vol. 13, No. 4, (c) 2003, pp. 311-372.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Srivastava, Jaideep, et al., "We Usage Mining: Discovery and Applications of Usage Pa tterns from Web Data", SIGKDD Explorations, vol. 1. Issue 2, Jan. 2000, pp. 12-23.
Uehara, Satoru, et al., "An Implementation of Electronic Shopping Cart on the Web System Using component-Object Technology", Proc. of the 6$^{th}$ International Conf./ on Object-Oriented Real-Time Dependable Systems, Jan. 8-10, 2001, pp. 77-84.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.
Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.
Office Action mailed Aug. 10, 2009 from U.S. Appl. No. 11/427,282, filed Jun. 28, 2006.
Office Action mailed Apr. 27, 2010 from U.S. Appl. No. 11/427,282, filed Jun. 28, 2006.
Office Action mailed Jul. 26, 2010 from Japanese Serial No. JP2008-519504 filed Jun. 28, 2006.
Yuichi Yagawa et al. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.
Office Action mailed May 12, 2008 from U.S. Appl. No. 11/427,243, filed Jun. 28, 2006.
Office Action mailed Dec. 8, 2008 from U.S. Appl. No. 11/427,243, filed Jun. 28, 2006.
Office Action mailed Jun. 25, 2009 from U.S. Appl. No. 11/427,243, filed Jun. 28, 2006.
Office Action mailed Feb. 4, 2010 from U.S. Appl. No. 11/427,243, filed Jun. 28, 2006.

(56) References Cited

OTHER PUBLICATIONS

Office Action mailed Oct. 12, 2010 from U.S. Appl. No. 11/427,243, filed Jun. 28, 2006.
Office Action mailed Sep. 16, 2010 from British Serial No. GB0724938.6 filed Jun. 28, 2008.
Office Action mailed Aug. 3, 2009 from U.S. Appl. No. 11/427,226, filed Jun. 28, 2006.
Office Action mailed Jun. 7, 2010 from U.S. Appl. No. 11/427,226, filed Jun. 28, 2006.
Office Action mailed Feb. 2, 2010 from European Serial No. 06013103.4 filed Jun. 16, 2006.
Hancock, Wayland, A New Way to Get Information From the Internet, American Agent & Broker; Nov. 1997; 69, 11; ABI/INFORM Global, p. 64 & 66.
Nilsson, B.A., Invasion of the Webcasters, PC World, Sep. 1997, pp. 205-216.
Netcaster Developer's Guide, Netscape Communicator, Sep. 25, 1997, pp. 1-112.
BackWeb User's Guide, about 1997/1998, pp. 1-48.
Foreign Examination Report cited in corresponding Great Britain application, GB0724938.6, dated Jan. 11, 2010, 2 pages.
ComScore Marketing Solutions and Media Metrix (9 sheets), webpage) [online), 2003 comScore Networks, Inc. (retrieved on Oct. 8, 2003), retrieved from the internet: <URL:http://www.comscore.com>.
Nielsen/ffitetRatings (24 sheets), webpage [online), 2003 NetRatings, Inc. (retrieved on Oct. 8, 2003), retrieved from the internet: <URL:http://www.nielsen-netratings.com>.
European Search Report for Application No. EP 06 01 3103 (2 sheets).
PCT International Search Report and Written Opinion dated Jan. 23, 2007, for International Application No. PCT/US06/025104.
PCT International Search Report and Written Opinion dated Jun. 28, 2006, for International Application No. PCT/US06/025103.
PCT International Search Report and Written Opinion dated Feb. 9, 2007, for International Application No. PCT/US07/061944.
PCT International Search Report and Written Opinion dated Jul. 26, 2007, for International Application No. PCT/US06/025102.
PCT International Search Report and Written Opinion dated Jul. 12, 2007, for International Application No. PCT/US06/023386.
Mitchell, T., "Decision Tree Learning Based on Machine Learning" (Apr. 5, 2003), available online at http://web.archive.org/web/20030405202241/http://www.cs.cmu.edu/afs/cs.cmu.edu/project/theo-20/www/nnlbook/ch3.ps>, pp. 49-49, 65-66, and 74.

* cited by examiner

TECHNIQUES FOR DISPLAYING IMPRESSIONS IN DOCUMENTS DELIVERED OVER A COMPUTER NETWORK

CROSS-REFERENCE TO RELATED APPLICATION

This application is a continuation application of U.S. patent application Ser. No. 11/263,501, filed on Oct. 31, 2005, issued as U.S. Pat. No. 8,086,697, on Dec. 27, 2011, which claims the benefit of U.S. Provisional Application No. 60/694,533, filed on Jun. 28, 2005.

BACKGROUND OF THE INVENTION

1. Field of the Invention

The present invention relates generally to computer systems, and more particularly but not exclusively to displaying of impressions in documents delivered over a computer network.

2. Description of the Background Art

The Internet is an example of a computer network. On the Internet, end-users (i.e. consumers) on client computers may access various types of information resident in server computers. Information on the Internet is typically available in the form of documents referred to as "web pages." A server computer that provides web pages over the Internet is also referred to as a "web server" or a "website". A website comprises a plurality of web pages. A website may provide information about various topics or offer goods and services, for example. Just like in other medium, such as radio and television, advertisements allow websites to provide free access to web pages and other services. That is, advertising revenues help pay for the development and maintenance of websites.

FIG. 1 shows a flow diagram schematically illustrating an example of how an advertisement is delivered to a client computer 120 on the Internet. A web page 132 has an advertising space 134 where an advertising server 140 may serve an advertisement 142. The web server 130 provides the web page 132 to the client computer 120 (arrow 151) upon request, such as by pointing a web browser to the uniform resource locator (URL) of the web page 132 on the Internet. When the web page 132 is received in the client computer 120, program code of the web page 132 requests the advertisement 142 from the advertising server 140 (arrow 152). In response, the advertising server 140 serves the advertisement 142 to the web page 132 (arrow 153), resulting in the advertisement 142 being displayed in the advertisement space 134. The advertisement 142 is normally designated to be displayed in the advertisement space 134 regardless of whether or not the advertisement 142 is the best advertisement for that space.

SUMMARY

In one embodiment, an impression to be displayed in a placement of a web page is selected from candidate impressions that may be displayed in the placement. The candidate impression may be chosen based on behavioral data and a placement identifier particularly identifying the placement. The behavioral data may include categories of websites visited by an end-user on the client computer. The candidate impressions may be in learning modes, and the impression displayed in the placement may be selected based on its learning mode and revenue generation capability.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
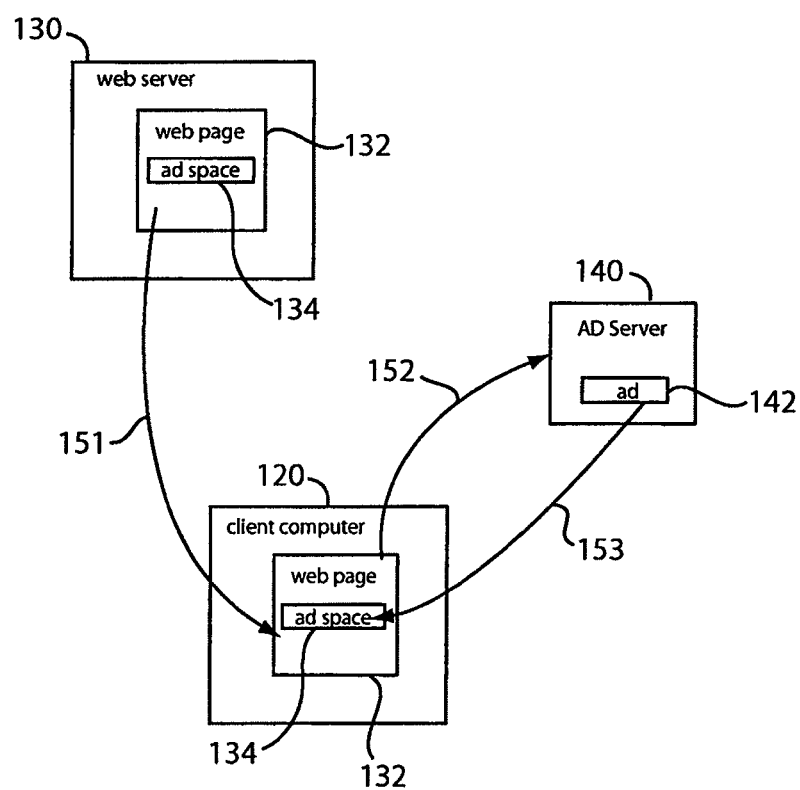
FIG. 1 shows a flow diagram schematically illustrating an example of how an advertisement is delivered to a client computer on the Internet.
Figure 2:
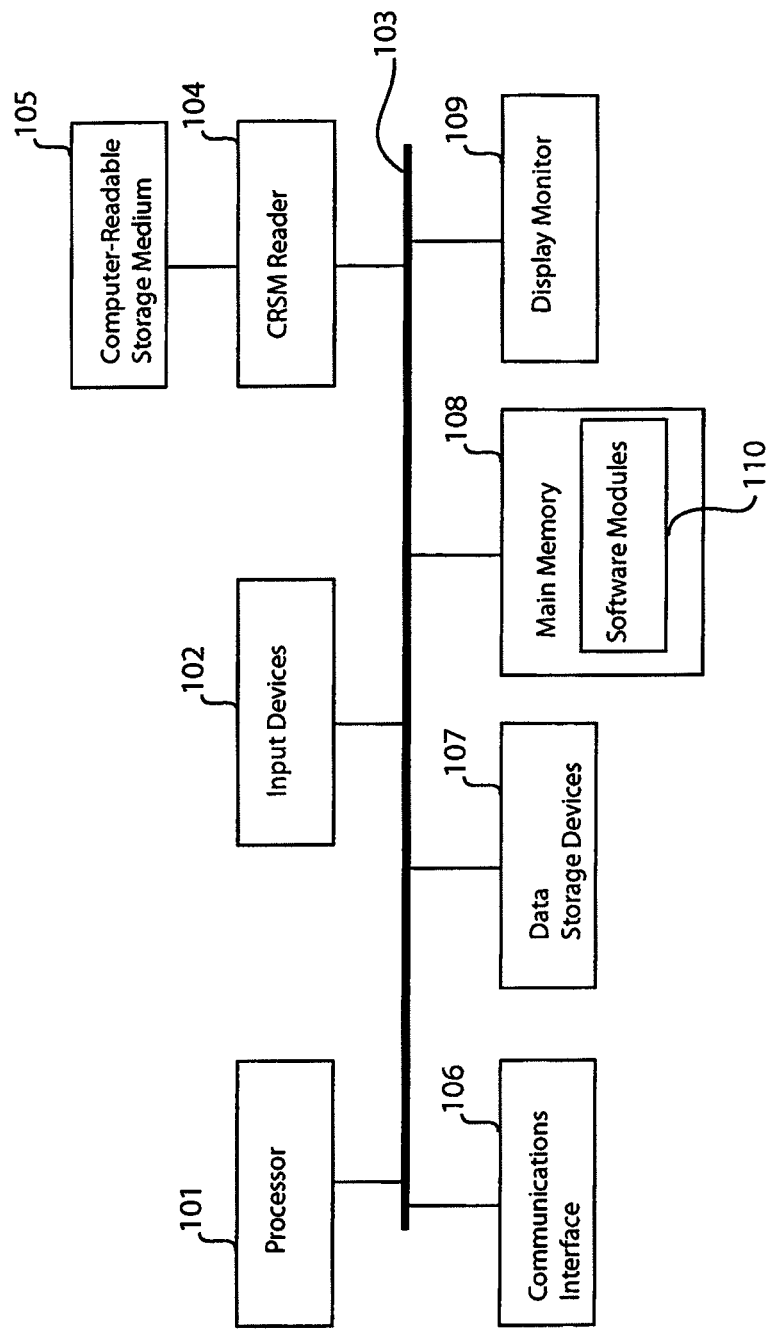
FIG. 2 shows a schematic diagram of an example computer that may be used in embodiments of the present invention.

Referring now to FIG. 2, there is shown a schematic diagram of an example computer that may be used in embodiments of the present invention. Depending on its configuration, the computer shown in the example of FIG. 2 may be employed as a client computer, a web server, an impressions server, or other data processing apparatus. The computer of FIG. 2 may have less or more components to meet the needs of a particular application. As shown in FIG. 2, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM, flash memory), a CRSM reader 104 (e.g., floppy drive, CD-ROM drive, flash memory reader), a display monitor 109

(e.g., cathode ray tube, flat panel display), a communications interface 106 (e.g., network adapter, modem) for coupling to a network, one or more data storage devices 107 (e.g., hard disk drive, optical drive, non-volatile memory), and a main memory 108 (e.g., RAM). Software embodiments may be stored in the computer-readable storage medium 105 for reading into the data storage device 107 or the main memory 108. Software embodiments in the main memory 108 may be executed by the processor 101. In the example of FIG. 2, the main memory 108 is shown as comprising software modules 110, which may comprise one or more software components of a client computer 320 or impressions server 340 described later on below. The software modules 110 may be loaded from the computer-readable storage medium 105, the data storage device 107, or over the Internet by way of the communications interface 106, for example. The software modules 110 and other programs in the main memory 108 may be executed by the processor 101.

Figure 3:
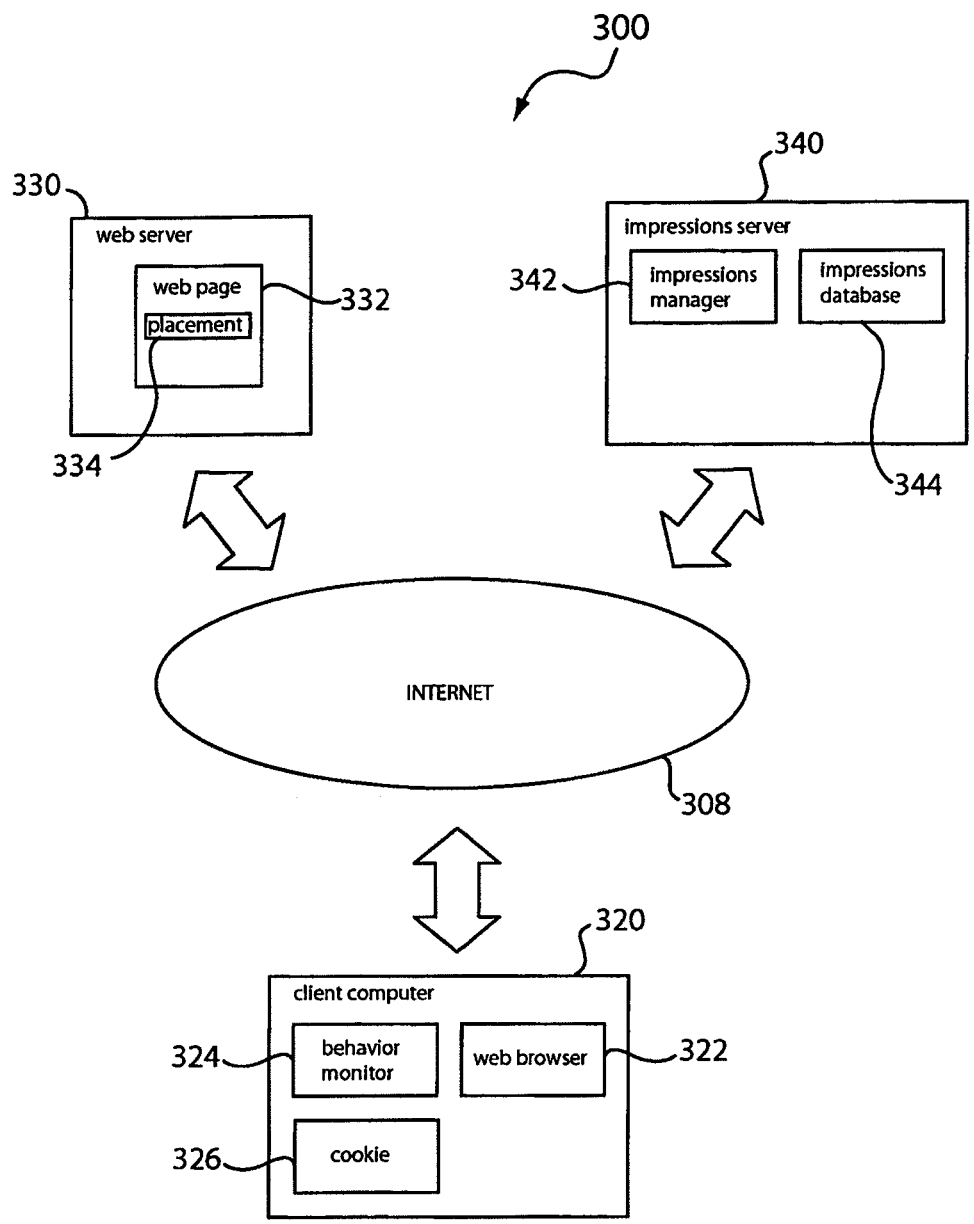
FIG. 3 a schematically shows a computing environment in accordance with an embodiment of the present invention.

FIG. 3 a schematically shows a computing environment 300 in accordance with an embodiment of the present invention. The computing environment 300 may include one or more client computers 320, one or more web servers 330, and one or more impressions servers 340. Only one of each is shown in FIG. 3 for clarity of illustration. In practice, one impressions server 340 may serve a plurality of client computers 320. A client computer 320, a web server 330, and an impressions server 340 may communicate over a public computer network 308, which in the example of FIG. 3 comprises the Internet.

A client computer 320 is typically, but not necessarily, a personal computer such as those running the Microsoft Windows™ operating system, for example. In the example of FIG. 3, the client computer 320 includes a web browser 322, a behavior monitor 324, and a cookie 326. The web browser 322 may be a commercially available web browser or web client. In one embodiment, the web browser 322 comprises the Microsoft Internet Explorer™ web browser. The web browser 322 allows an end-user on the client computer 320 to access a web page over the Internet. A web page, such as a web page 332 of a web server 330, has a corresponding address referred to as a uniform resource locator ("URL"). The web browser 322 is pointed to the URL of a web page to receive that web page in the client computer 320. The web browser 322 may be pointed to a URL by entering the URL at an address window of the web browser 322, or by clicking a link pointed to that URL, for example.

The behavior monitor 324 is a client-side program in that it is stored and run in the client computer 320. The behavior monitor 324 may comprise computer-readable program code for monitoring the online activities of the end-user on the client computer 320. It is to be noted that the mechanics of monitoring an end-user's online activities, such as determining where an end-user is navigating to, the URLs of web pages received in the client computer 320, the domain names of websites visited by the end-user, what the end-user is typing on a web page, whether the end-user clicked on a link on a web page, when the end-user activates a mouse or keyboard, and the like, is, in general, known in the art and not further described here. For example, the behavior monitor 324 may learn of end-user online activities by receiving event notifications from the web browser 322. The behavior monitor may work in conjunction with another server (not shown). Techniques for monitoring end-user online activities using a client-side program are also disclosed in commonly-owned U.S. application Ser. No. 10/152,204, entitled "Method and Apparatus for Displaying Messages in Computer Systems," filed on May 21, 2002 by Scott G. Eagle, David L. Goulden, Anthony G. Martin, and Eugene A. Veteska, which is incorporated herein by reference in its entirety.

In one embodiment, websites and web pages are grouped according to categories. Each category may include a listing of websites and/or web pages (e.g. by URL) relevant to that category. For example, websites and web pages relating to vacations, such as those from tourism bureaus, hotel chains, rental cars, and other vacation-related websites, may be included in the "vacations" category, websites and web pages relating to cars may be included in the "cars" category, and so on. A website or web page may belong to more than one category. For example, a website pertaining to wood working may belong to both the "power tool" category and the "hobby category." A human researcher may categorize popular websites and web pages by categories and store the categories and associated websites and web pages (as identified by URL, for example) in a category table or database accessible to the behavior monitor 324. The behavior monitor 324 may listen for the URLs of websites visited by the end-user, determine the categories of the websites (e.g. by consulting the category table), and store or facilitate storage of the categories in the cookie 326.

In one embodiment, the behavior monitor 324 further includes computer-readable program code for recording the impressions already delivered to the client computer 320 and whether or not the end-user interacted (e.g. by mouse clicking) with any of the impressions. Each impression that has already been displayed in the client computer 320 may be identified by its impression ID and stored in the cookie 326. As will be more apparent below, this allows the impressions server 340 to minimize repeated displaying of the same impressions or similar impressions that the end-user is likely not interested in.

The cookie 326 may also contain a client computer ID that anonymously and uniquely identifies the client computer 320. The cookie 326 is shown as a single cookie in the example of FIG. 3 for clarity of illustration. The contents of the cookie 326 may also be separated out in multiple cookies without detracting from the merits of the present invention. The use of cookies to carry various types of data is also disclosed in the commonly-assigned U.S. application Ser. No. (not yet known), entitled "Method and Device for Publishing Cross-Network User Behavioral Data," filed on Sep. 14, 2005, by Anthony Martin, David L. Goulden, Dominic V. Bennett, Roger Petersen, and Remigiusz Paczkowski, Express Mail No. EV 314047068U.S., which is incorporated herein by reference in its entirety.

A web server 330 may comprise hardware and software components for providing web pages to client computers 320. In the example of FIG. 2, the web server 330 provides a web page 332 over the Internet. The web page 332 may contain information that is of interest to end-users surfing on the Internet. The web page 332 may include a placement 334 in which an impression may be displayed. The placement 334 may have an associated identifier, referred to as "placement ID," for identifying the particular web page 332 where the placement 334 is located. As will be more apparent below, the placement ID allows the impressions server 340 to identify the particular web page requesting the impressions. This enables the impressions server 340 to select what it deems as the best impression for that web page. The placement ID may be in the form of a hypertext markup language (HTML) tag embedded in the web page 332, for example.

As used in the present disclosure, an "impression" refers to a message configured to be displayed a certain way on the web page 332. In the example of FIG. 3, the placement 334 includes computer-readable program code for requesting an impression from the impressions server 340 and displaying the impression in the web page 332 in the client computer 320. For example, the placement 334 may include HTML code for pulling an impression from the impressions server 340.

An impressions server 340 may comprise hardware and software components for serving impressions to client computers 320. The impressions server 340 may comprise an impressions manager 342 and an impressions database 344. The components and functionalities of the impressions server 340 may be in one or more server computers.

An impression may comprise a message and a creative. A creative is a design of how the message is to be presented to end-users. As can be appreciated, a single message may be displayed using different creatives. For example, an announcement of the release of a new movie (message) may be displayed as a conventional banner (first creative), a banner with accompanying music (second creative), a banner displaying the movie's trailer (third creative), or a banner with varying texts depending on the particular placement (fourth creative), for example. A single message may thus be in a plurality of impressions, each of which has a different creative for the message.

Impressions available for serving from the impressions server 340 may be stored in the impressions database 344. Impressions database 344 may comprise a commercially-available database program, such as those available from the Oracle Corporation of Redwood Shores, Calif. The impressions in the impressions database 344 may be assigned to be displayed only in specific web pages identified by placement ID. For example, an impression for a vacations advertisement may be contracted to be displayed to a web page in a first website, all web pages in a second website, and so on. In that case, the impression as stored in the impression database 344 may have a corresponding entry indicating the placement ID's of placements 334 where the impression may be displayed.

The impressions manager 342 may comprise computer-readable program code for selecting an impression among a plurality of available impressions and serving that impression to a requesting client computer 320. In one embodiment, the impressions manager 342 selects from a plurality of impressions available from the impressions database 344. The impressions manager 342 may select what it deems as the optimum impression for a particular placement. The optimum impression for a particular placement may be the one that generates or is likely to generate the most revenue when displayed in that particular placement. As can be appreciated, advertisers may pay advertising fees based on a number of impressions that have been served to client computers. For example, an advertiser may pay the operator of the impressions server 340 a particular amount for every thousand impressions served by the impressions server 340 to client computers 320. In selecting the optimum impression for a particular placement, the impressions server 340 may analyze data indicative of the number of times impressions have been served to client computers on the Internet and how much revenue the impressions generate.

Figure 4:
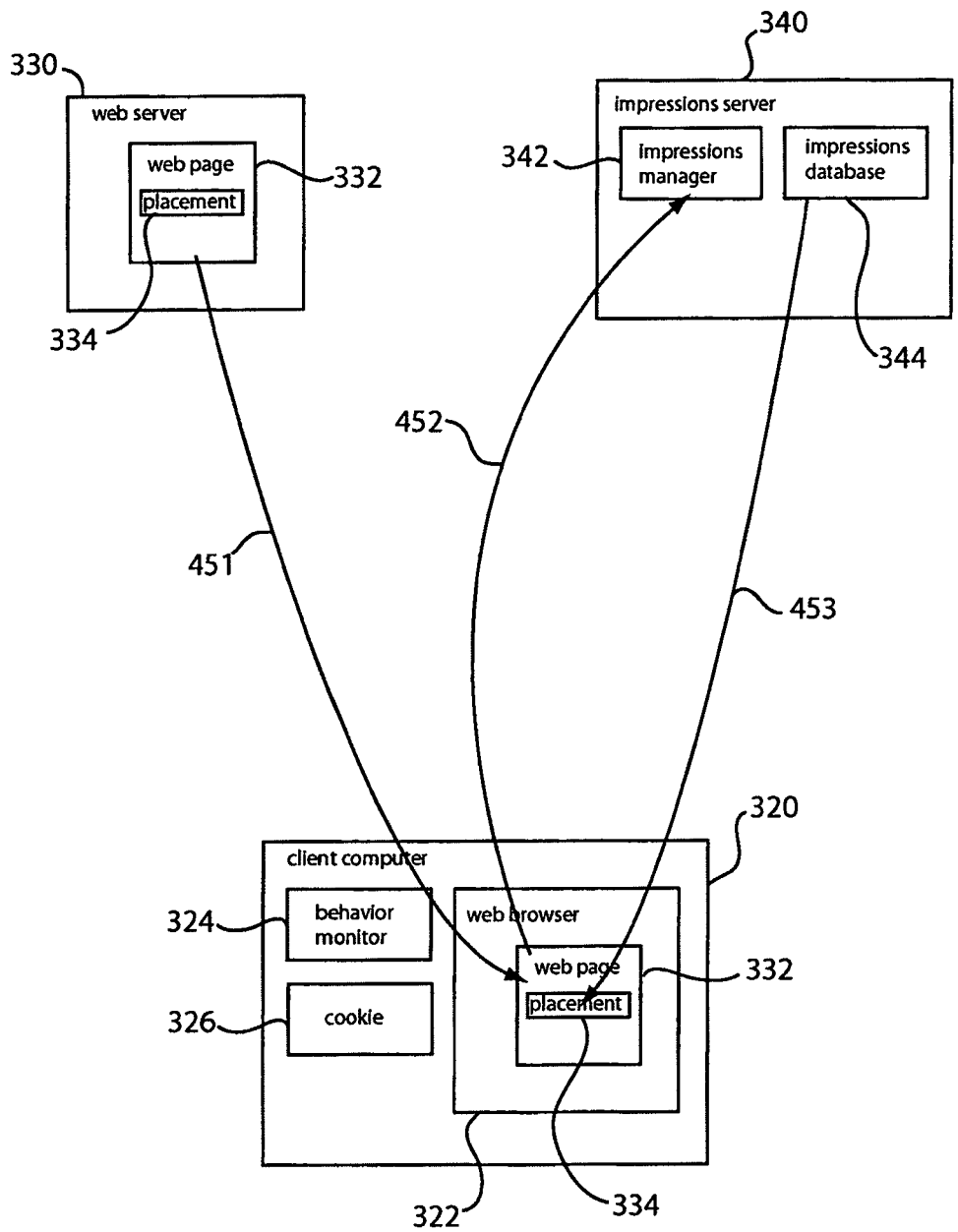
FIG. 4 shows a flow diagram of an example impression serving process in the computing environment of FIG. 3 in accordance with an embodiment of the present invention.

FIG. 4 shows a flow diagram of an example impression serving process in the computing environment 300 in accordance with an embodiment of the present invention. In the example of FIG. 4, the behavior monitor 324 monitors the websites visited by the end-user on the client computer 320 and stores or facilitates storage of the categories of those websites in the cookie 326. For example, if the end-user has previously viewed web pages relating to power tools and car rentals, the cookie 326 would contain encrypted or unencrypted data in the cookie 326 indicating the categories "power tools" and "car rentals." When the web browser 322 is pointed to receive the web page 332, the web server 330 provides the web page 332 to the client computer 320 for display in the web browser 322 (arrow 451). Upon receipt in the client computer 320, computer-readable program code in the web page 332 associated with the placement 334 sends a request for impression and the cookie 326 to the impressions manager 342 of the impressions server 340. (arrow 452). The request for impression may include the placement ID of the placement 334. The impressions manager 342 receives the request and, based on data in the cookie 326 and the placement 334 (as identified by its placement ID), selects an impression to be displayed in the placement 334. The impressions manager 342 may select the impression from among the plurality of impression in the impressions database 344 then serve the selected impression to the client computer 320 (arrow 453). In the client computer 320, the selected impression is displayed in the placement 334 of the web page 332.

Figure 5:
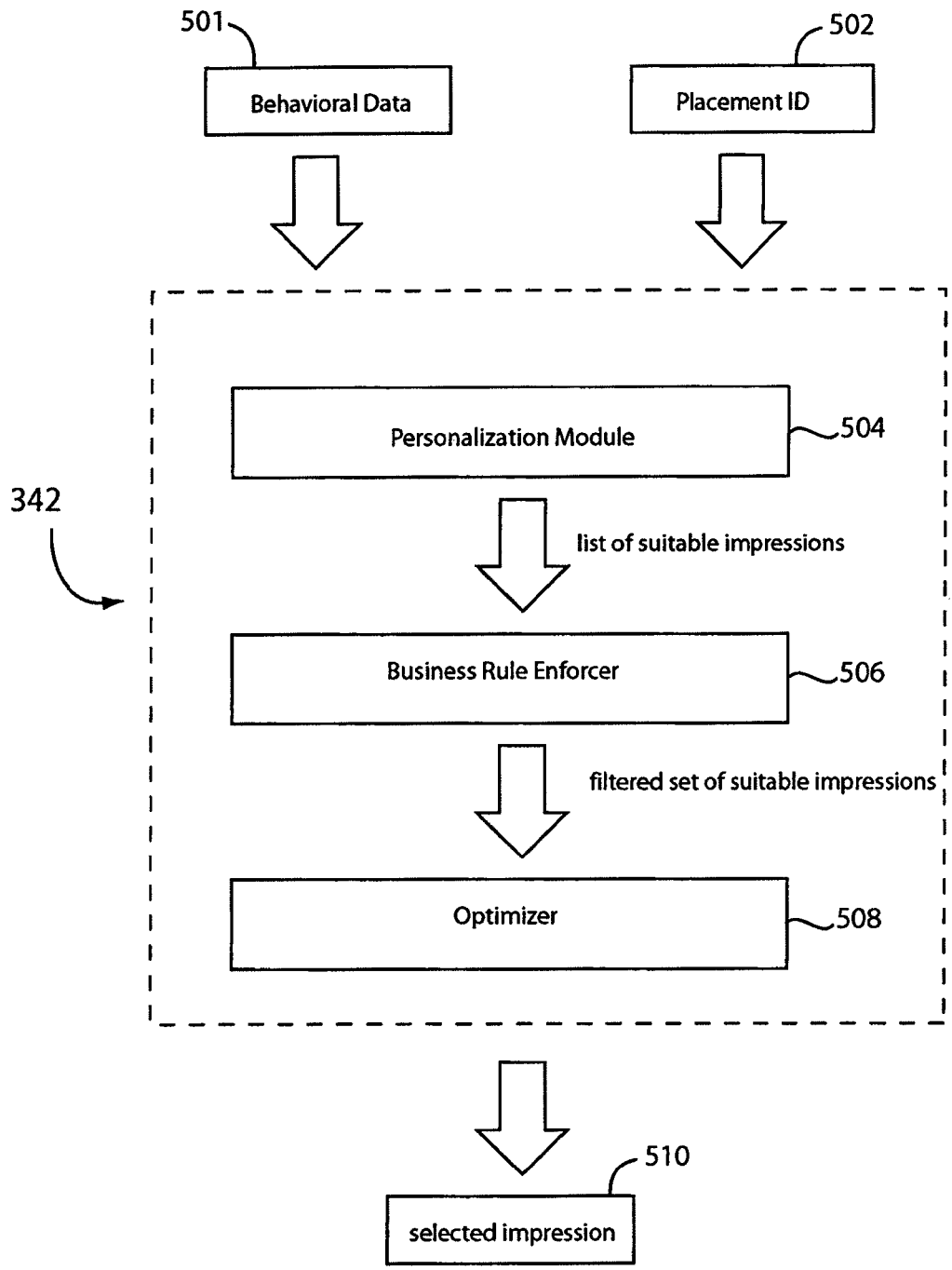
FIG. 5 schematically shows the components of an impressions manager in accordance with an embodiment of the present invention.

FIG. 5 schematically shows the components of an impressions manager 342 in accordance with an embodiment of the present invention. In the example of FIG. 5, the impressions manager 342 comprises a personalization module 504, a business rule enforcer 506, and an optimizer 508. In one embodiment, the impressions manager 342 receives behavioral data 501 and a placement ID 502 as inputs and determines a selected impression 510 as an output. The behavioral data 501 may comprise information indicative of an end-user's preference based on monitoring of the end-user's online behavior. In one embodiment, the behavioral data 501 indicate the categories of websites previously visited by the end-user. The behavioral data 501 may also indicate the impressions already displayed in the client computer 320 and whether or not the end-user interacted with the impressions. The behavioral data 501 may contain the client computer ID of the client computer 320 for identification purposes. The behavioral data 501 may be stored in a cookie 326, which the impressions server 340 receives from the end-user's client computer 320.

Generally speaking, a placement is a location in a web page of a website in which an impression is to be displayed. The placement ID 502 identifies a particular placement 334. The placement ID 502 thus allows the impressions manager 342 to identify the website serving the web page that contains the placement. Identifying the website not only facilitates accounting how many times an impression has been served to a web page of the website for billing purposes, but also advantageously helps in determining the best performing impression to serve to the web page based on revenue.

The personalization module 504 may comprise computer-readable program code for determining a list of impressions suitable for display in a particular placement. In the example of FIG. 5, the personalization module 504 receives the behavioral data 501 and the placement ID as input. In one embodiment, the personalization module goes through available impressions in the impressions database 344 and generates a list of impressions related to the same categories of websites indicated in the behavioral data 501 and may be displayed in the particular placement identified by the placement ID 502. The personalization module 504 advantageously allows for selection of impressions most likely to be of interest to the end-user as it finds impressions in the same categories as the websites previously visited by the end-user.

The business rule enforcer 506 may comprise computer-readable program code for determining which of the suitable impressions found by the personalization module 504 complies with business rules designed to further increase the likelihood that the end-user will be interested in the impressions. In one embodiment, the business rule enforcer reads the impression ID's and the client computer ID in the behavioral data 501 to find impressions that have already been displayed in the client computer 320. The business rule enforcer 506 may filter out (i.e. remove) those impressions from the list of suitable impressions. The business rule enforcer 506 may also filter out impressions belonging to a category that the end-user has not expressed interest in (e.g. did not interact with impressions in that category). The business rule enforcer may also enforce additional or other rules to the list of suitable impressions without detracting from the merits of the present invention.

The optimizer 508 may comprise computer-readable program code for selecting an optimum impression among a plurality of suitable impressions. In one embodiment, the optimizer 508 selects the optimum impression from the filtered set of suitable impressions generated by the business rule enforcer 506. The optimizer 508 may also select the optimum impression from the list of suitable impressions found by the personalization module 504 in cases where the business rule enforcer 506 is not employed. In one embodiment, the optimizer 508 selects the optimum impression based on revenue generation. That is, the optimizer 508 may select as optimum an impression that results in the most revenue when displayed in the client computer 320. Of course, the teachings of the present disclosure may also be adapted to use factors other than revenue without detracting from the merits of the present invention. The optimum impression selected by the optimizer 508 is shown in FIG. 5 as selected impression 510.

In one embodiment, the optimizer 508 groups impressions according to learning modes. A learning mode is indicative of the amount of data available for a given impression. In one embodiment, a learning mode is a measure of the number of times a given impression has been served to web pages across the Internet.

In one embodiment, an impression that has been served less than or equal to a first predetermined threshold number of times X in a particular placement or any placement is in "non-scaled" mode. Non-scaled is a pure learning mode as it means the impression has not been served enough times to provide reliable data about its performance.

In one embodiment, an impression that has been served greater than or equal to a second predetermined threshold number of times Y in any placement, where Y>X, is in "globally scaled" mode. An impression that is in globally scaled mode has enough data to allow for reasonably reliable determination of how the impression performs on a global basis (not in any particular placement).

In one embodiment, an impression that has been served greater than or equal to a third predetermined threshold number of times Z in a particular placement, where Z>Y, is in "fully scaled" mode. An impression that is in fully scaled mode has enough data to allow for reasonably reliable determination of how the impression performs on a particular placement (as opposed to placements in general). That is, an impression in fully scaled mode has been displayed enough times in a particular placement to provide reasonably reliable information about its performance in that placement. An impression that satisfies both the requirements for globally scaled and fully scaled modes may be deemed to be in fully scaled mode. The values of X, Y, and Z may vary depending on the application. The optimizer 508 may keep track of the number of times a particular impression has been served and to which web page to allow the optimizer 508 to determine the learning mode of the impression.

For each particular impression, the optimizer 508 may keep track of the revenue generated by displaying the impression in a particular placement (as identified by placement ID) and the learning mode of the impression. An example look up table accessible to the optimizer 508 for keeping track of impression data is shown in Table 1.

TABLE 1

| Impression ID (Message/Creative) | Placement ID | Revenue per thousand (RPM) | Learning Mode |
|---|---|---|---|
| 2001 | 10001 | $1.75 | Non-scaled |
| 2002 | 10001 | $2.50 | Fully Scaled |
| 2003 | 10001 | $1.99 | Globally Scaled |
| ... | ... | ... | ... |
| ... | ... | ... | ... |
| 2051 | 10002 | $4.60 | Non-scaled |
| 2052 | 10002 | $1.25 | Non-scaled |
| 2053 | 10002 | $3.34 | Globally scaled |
| ... | ... | ... | ... |
| ... | ... | ... | ... |
| 2094 | 10003 | $2.30 | Fully Scaled |
| 2095 | 10003 | $2.50 | Fully Scaled |
| 2096 | 10003 | $1.25 | Fully Scaled |
| ... | ... | ... | ... |
| ... | ... | ... | ... |
| 2053 | 10002 | $3.34 | Globally scaled |
| ... | ... | ... | ... |
| ... | ... | ... | ... |
| 2094 | 10003 | $2.30 | Fully Scaled |
| 2095 | 10003 | $2.50 | Fully Scaled |
| 2096 | 10003 | $1.25 | Fully Scaled |
| ... | ... | ... | ... |
| ... | ... | ... | ... |

In the example of Table 1, an impression ID identifies a particular message-creative combination forming an impression. The RPM column indicates the amount of revenue generated by displaying the impression in a particular placement in a web page. For example, the impression associated with impression ID 2001 generates $1.75 every thousand times it is displayed in the placement having the placement ID 10001. The learning mode column indicates the learning mode of the impression. In the example of Table 1, an impression having the impression ID of 2001, 2002, or 2003 may be displayed in a placement having a placement ID of 10001, an impression having the impression ID of 2051, 2052, or 2053 may be displayed in a placement having a placement ID of 10002, and so on. The optimizer 508 may employ data similar to that in Table 1 in selecting an optimum impression.

Figure 6:
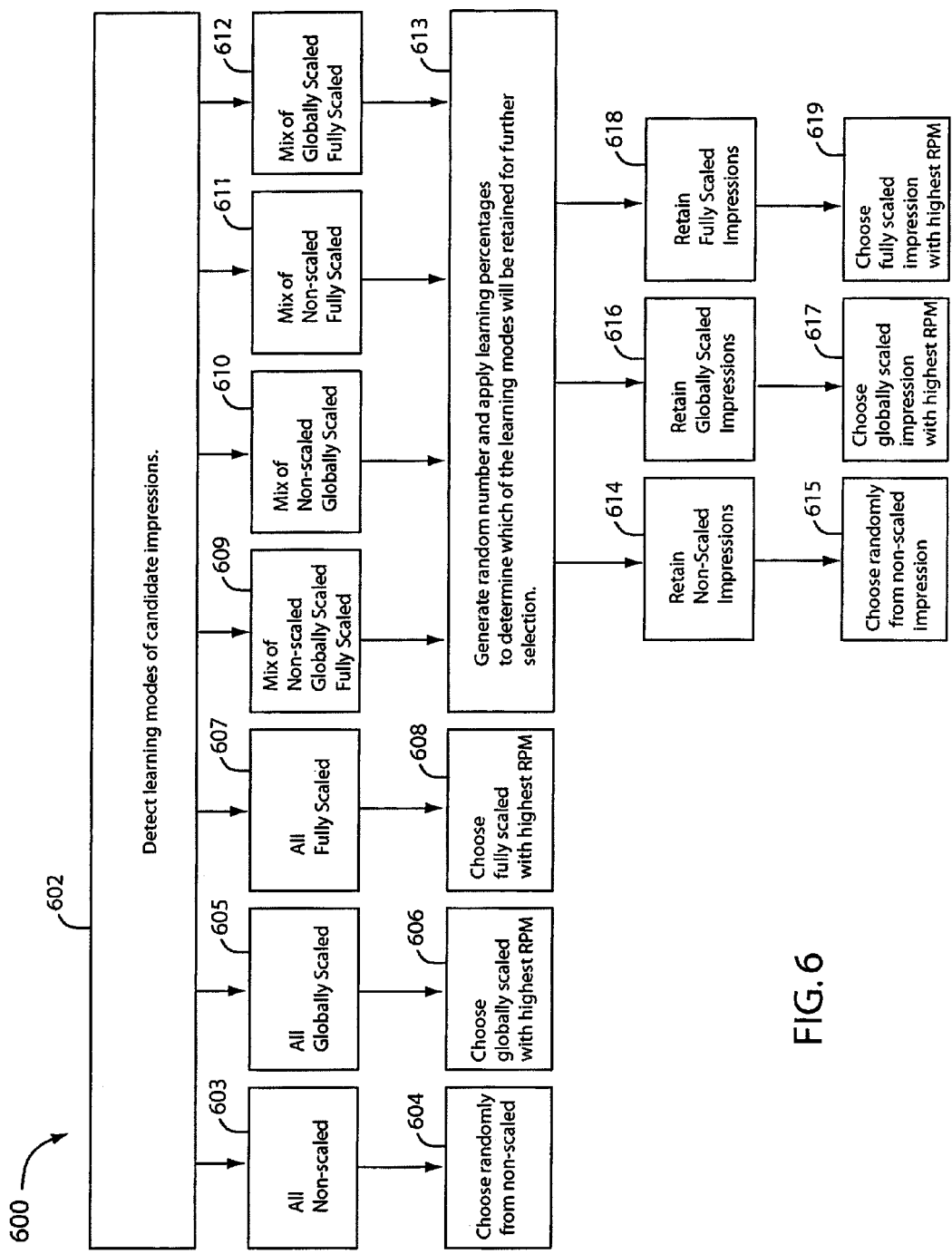
FIG. 6 shows a flow diagram of a method of selecting an impression among a plurality of candidate impressions that may be displayed in a placement of a particular web page in accordance with an embodiment of the present invention.

FIG. 6 shows a flow diagram of a method 600 of selecting an impression among a plurality of candidate impressions that may be displayed in a placement of a web page. The candidate impressions may be those in the list of suitable impressions found by the personalization module 504 or from the filtered set of suitable impressions found by the business rule enforcer 506, for example. The method 600 may also be performed by other components without detracting from the merits of the present invention.

In block 602, the optimizer 508 detects the learning modes of the candidate impressions. The optimizer 508 may consult a table (e.g. Table 1) or a database to determine the learning mode of each of the candidate impressions.

Block 603 follows from block 602 when all of the candidate impressions are in non-scaled mode. In that case, in block 604, the optimum impression is randomly selected from the candidate impressions.

Block 605 follows from block 602 when all of the candidate impressions are in globally scaled mode. In that case, in block 606, the optimum impression is the globally scaled impression that generates the highest revenue among the candidate impressions.

Block 607 follows from block 602 when all of the candidate impressions are in fully scaled mode. In that case, in block 608, the optimum impression is the fully scaled impression that generates the highest revenue among the candidate impressions.

Blocks 609, 610, 611, and 612 follow from block 602 when the candidate impressions have different learning modes. In block 609, the candidate impressions consist only of impressions that are in non-scaled mode, impressions that are in globally scaled mode, and impressions that are in fully scaled mode. In block 610, the candidate impressions consist only of impressions that are in non-scaled mode and impressions that are in globally scaled mode. In block 611, the candidate impressions consist only of impressions that are in non-scaled mode and impressions that are in fully scaled mode. In block 612, the candidate impressions consist only of impressions that are in globally scaled mode and impressions that are in fully scaled mode.

In the case of blocks 609, 610, 611, and 612, the optimizer 508 generates a random number and applies learning mode percentages to determine which of the learning modes will be retained for further selection. Candidate impressions that are not in the learning mode that has been retained will be removed from further consideration. For example, if fully scaled mode has been retained for further selection, the optimum impression will be selected from candidate impressions that are in fully scaled mode. In that example, impressions that are in non-scaled or globally scaled mode will not be included in the selection of the optimum impression.

The learning percentages may be based on the number of candidate impressions in each of the learning modes. That is, the retained learning mode may be randomly chosen from among the learning modes with the probability scaled or adjusted according to the number of impressions in each of the learning modes. For example, if 60% of the candidate impressions are in non-scaled mode and 40% of the candidate impressions are in globally scaled mode, 100 integer numbers ("tickets") may be allocated with 60 of the numbers being assigned to non-scaled and 40 of the numbers being assigned to globally scaled. A random number is then generated to pick from the 100 integer numbers to determine which one of the learning modes (non-scaled or globally scaled in this example) will be retained. If non-scaled is selected, candidate impressions that are in non-scaled mode will be retained for further selection and the other candidate impressions (globally scaled in this example) are removed from consideration. If globally scaled is selected, candidate impressions that are in globally scaled mode will be retained for further selection and the other candidate impressions (non-scaled in this example) are removed from consideration. The procedure is similar for other combinations of learning modes.

Block 614 follows from block 613 when non-scaled mode is retained for further selection. In that case, in block 615, the optimum impression is randomly selected from among non-scaled impressions in the candidate impressions.

Block 616 follows from block 613 when globally scaled mode has been retained for further selection. In that case, in block 617, the optimum impression is the highest revenue generating globally scaled impression in the candidate impressions.

Block 618 follows from block 613 when fully scaled mode has been retained for further selection. In that case, in block 619, the optimum impression is the highest revenue generating fully scaled impression in the candidate impressions.

The optimum impression selected in blocks 615, 617, or 619 may be the selected impression 510 shown in the example of FIG. 5.

Figure 7:
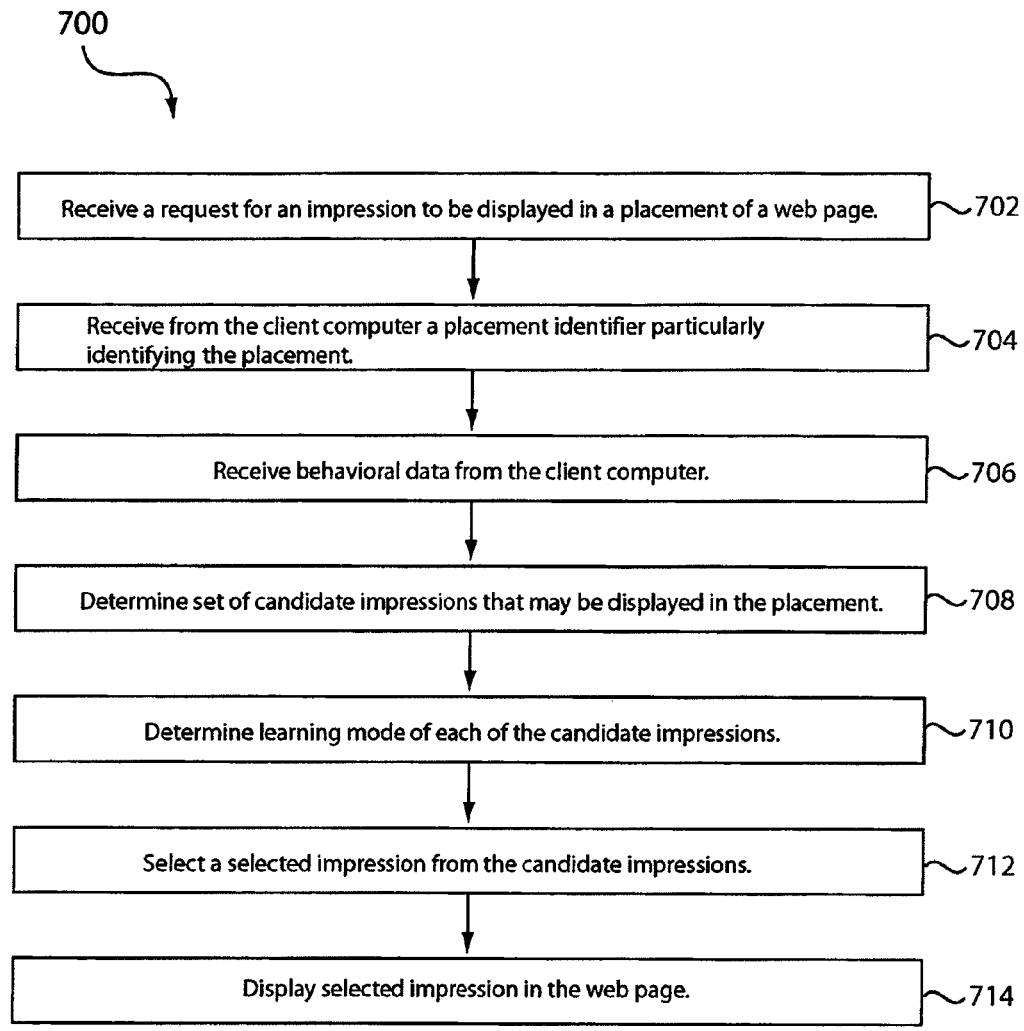
FIG. 7 shows a flow diagram of a method of displaying an impression on a web page in accordance with an embodiment of the present invention.

FIG. 7 shows a flow diagram of a method 700 of displaying an impression in a web page in accordance with an embodiment of the present invention. Method 700 may be, but not necessarily, performed in the computing environment 300 (FIG. 3). Method 700 may also be performed in other computing environments without detracting from the merits of the present invention.

In step 702, an impressions server receives a request for an impression to be displayed in a placement of a web page. The request for the impression may be provided by the client computer to the impressions server as a result of receiving the web page in the client computer.

In step 704, the impressions server receives from the client computer a placement identifier particularly identifying the placement. The placement identifier may comprise an HTML tag embedded in the web page, for example.

In step 706, the impressions server receives behavioral data from the client computer. The behavioral data may be stored in a cookie forwarded from the client computer to the impressions server. The behavioral data may be indicative of websites previously visited by an end user on the client computer and impressions previously received in the client computer. For example, the behavioral data may include categories of websites previously visited by the end user and a listing of impressions (e.g. advertisements) previously served to web pages in the client computer.

In step 708, the impressions server determines a set of candidate impressions that may be displayed in the placement. The candidate impressions may be determined based on the behavioral data and the placement identifier. For example, the candidate impressions may comprise impressions specifically designated to be displayed in a placement having the same placement identifier as that received from the client computer. As another example, the candidate impressions may comprise impressions that are related to a category of websites that is noted in the behavioral data.

In step 710, the impressions server determines the learning mode of each of the candidate impressions. A learning mode may be indicative of a number of times an impression has been served to web pages in client computers on the Internet.

In step 712, the impressions server selects a selected impression from the candidate impressions. The selected impression may be selected based on the learning mode and revenue generation capability of each of the candidate impressions.

In step 714, the selected impression is displayed in the placement of the web page.

Improved techniques for displaying impressions in documents delivered over a computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method comprising:
    receiving a request for an impression to be displayed in a placement of a web page;
    receiving a placement identifier particularly identifying the placement for the impression in the web page;
    receiving behavioral data indicative of an online history and previously received impressions;

determining a plurality of candidate impressions that may be displayed in the placement of the web page, based, at least in part, on the behavioral data;

determining a learning mode of each candidate impression, the learning mode of the each candidate impression being indicative of a number of times the each candidate impression has been served, wherein the learning mode is one of a plurality of learning modes, the plurality of learning modes comprising a first learning mode, a second learning mode, and a third learning mode, wherein the first learning mode includes candidate impressions that have been served less than or equal to a first predetermined threshold number of times, wherein the second learning mode includes candidate impressions that have been served more than the first predetermined threshold number of times and less than or equal to a second predetermined threshold number of times, and wherein the third learning mode includes candidate impressions that have been served more than the second predetermined threshold number of times;

applying learning mode percentages to determine a retained learning mode from the plurality of learning modes; and selecting a selected impression from the plurality of candidate impressions that are in the retained learning mode.

2. The method of claim 1, wherein determining the plurality of candidate impressions comprises:

using at least the behavioral data and the placement identifier to determine a first set of impressions that may be displayed in the web page;

generating a second set of impressions from the first set of impressions by applying business rules to the first set of impressions, the business rules being designed to increase a likelihood of interest in impressions in the second set of impressions.

3. The method of claim 2, wherein the business rules include a rule that impressions previously displayed are not included in the second set of impressions.

4. The method of claim 1, wherein the placement identifier comprises a hypertext markup language (HTML) tag.

5. The method of claim 1, wherein each impression in the plurality of candidate impressions comprises a message and an associated creative, the creative comprising a design of how the message is to be presented.

6. The method of claim 5, wherein the plurality of candidate impressions comprises:

a first message with an associated first creative;
the first message with an associated second creative; and
the first message with an associated third creative;
wherein the first, second, and third creatives are different from each other.

7. The method of claim 1, wherein:
the first learning mode is a non-scaled learning mode;
the second learning mode is a globally scaled learning mode; and
the third learning mode is a fully scaled learning mode.

8. The method of claim 1, wherein the behavioral data are received in a cookie.

9. The method of claim 1, wherein the placement identifier is received as part of the request.

10. The method of claim 1, wherein selecting the selected impression comprises:

randomly selecting the selected impression when all impressions in the retained learning mode are in the first learning mode; and selecting a highest revenue generating impression when all impressions in the retained learning mode are in the second learning mode or the third learning mode.

11. An impressions server configured to:
receive a request for an impression to be displayed in a placement of a web page;

receive a placement identifier identifying the placement of the impression in the web page, the placement identifier embedded in the web page;

receive behavioral data comprising information indicative of actions taken on previously visited websites and information indicative of impressions previously displayed;

select a set of candidate impressions from a set of impressions using at least the behavioral data and the placement identifier;

wherein each impression in the set of candidate impressions has an associated learning mode, the learning mode of each the impression being indicative of a number of times the each impression has been served, wherein the learning mode is one of a plurality of learning modes, the plurality of learning modes comprising a first learning mode, a second learning mode, and a third learning mode, wherein the first learning mode includes impressions that have been served less than or equal to a first predetermined threshold number of times, wherein the second learning mode includes impressions that have been served more than the first predetermined threshold number of times and less than or equal to a second predetermined threshold number of times, and wherein the third learning mode includes impressions that have been served more than the second predetermined threshold number of times;

select a selected impression based at least in part on a learning mode of each impression in the set of candidate impressions; and forward the selected impression to display in the placement of the web page.

12. The impressions server of claim 11, wherein the behavioral data are stored in a cookie received by the impressions server.

13. The impressions server of claim 12, further comprising a behavior monitor including computer-readable program code for monitoring online-activities, the behavior monitor being configured to facilitate storage in the cookie categories of previously visited websites.

14. A method comprising:
receiving a request for an impression to be displayed in a placement of a web page;

receiving a cookie comprising data including behavioral data indicative of categories of websites previously visited; and using at least the behavioral data to select a selected impression from a plurality of candidate impressions that may be displayed in the placement of the web page, the selected impression being selected from the plurality of candidate impressions based at least in part on anticipated revenue generation, wherein selecting the selected impression from the plurality of candidate impressions comprises:

randomly selecting the selected impression from the plurality of candidate impressions when all impressions in the plurality of candidate impressions are in a first learning mode, and selecting a highest revenue generating impression in the plurality of candidate impressions as the selected impression when all impressions in the plurality of candidate impressions are in a second learning mode, and selecting a highest revenue generating impression in the plurality of candidate impressions as the selected impression when all of the impressions in the plurality of candidate impressions are in a third learning mode;

wherein the first learning mode includes impressions that have been served less than or equal to a first predetermined threshold number of times, wherein the second learning mode includes impressions that have been served more than the first predetermined threshold number of times and less than or equal to a second predetermined threshold number of times, and wherein the third learning mode includes impressions that have been served more than the second predetermined threshold number of times.

15. The method of claim 14, further comprising:
receiving a placement identifier identifying the placement.

16. The method of claim 14, wherein the plurality of candidate impressions comprise:
a first message with an associated first creative;
the first message with an associated second creative; and
the first message with an associated third creative;
wherein the first, second, and third creatives being different from each other.

17. The method of claim 14, wherein selecting the selected impression from the plurality of candidate impressions further comprises:
selecting impressions in the plurality of candidate impressions that are all in the first learning mode, the second learning mode, or in the third learning mode when at least some impressions in the plurality of candidate impressions are in different learning modes.

18. The method of claim 14, wherein:
the first learning mode is a non-scaled learning mode,
the second learning mode is a globally scaled learning mode, and
the third learning mode is a fully scaled learning mode.

19. A method, comprising:
receiving a request for an impression to be displayed in a placement of a web page
receiving a placement identifier particularly identifying the placement for the impression in the web page;
receiving behavioral data indicative of an online history and previously received impressions;
determining a plurality of candidate impressions that may be displayed in the placement of the web page, based, at least in part, on the behavioral data;
determining a learning mode of each candidate impression, the learning mode of the each candidate impression being indicative of a number of times the each candidate impression has been served,
wherein the learning mode is one of a plurality of learning modes, the plurality of learning modes comprising a first learning mode, a second learning mode, and a third learning mode,
wherein the first learning mode includes candidate impressions that have been served less than or equal to a first predetermined threshold number of times,
wherein the second learning mode includes candidate impressions that have been served more than the first predetermined threshold number of times and less than or equal to a second predetermined threshold number of times, and
wherein the third learning mode includes candidate impressions that have been served more than the second predetermined threshold number of times; and
selecting a selected impression from the plurality of candidate impressions.

20. The method of claim 19, wherein:
the first learning mode is a non-scaled learning mode,
the second learning mode is a globally scaled learning mode, and
the third learning mode is a fully scaled learning mode.

* * * * *